US011999345B2

(12) United States Patent
Shah

(10) Patent No.: US 11,999,345 B2
(45) Date of Patent: Jun. 4, 2024

(54) VELOCITY-BASED RELEVANCE FILTER

(71) Applicant: Zoox, Inc., Foster City, CA (US)

(72) Inventor: Prateek Chandresh Shah, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 410 days.

(21) Appl. No.: 17/117,641

(22) Filed: Dec. 10, 2020

(65) Prior Publication Data

US 2022/0185266 A1   Jun. 16, 2022

(51) Int. Cl.
*B60W 30/09* (2012.01)
*B60W 30/095* (2012.01)
*G01C 21/00* (2006.01)

(52) U.S. Cl.
CPC ........ *B60W 30/09* (2013.01); *B60W 30/0953* (2013.01); *B60W 30/0956* (2013.01); *G01C 21/3885* (2020.08); *B60W 2420/403* (2013.01); *B60W 2420/408* (2024.01); *B60W 2520/10* (2013.01); *B60W 2554/404* (2020.02); *B60W 2556/50* (2020.02)

(58) Field of Classification Search
CPC ........................ B60W 30/09; G01C 21/3885
See application file for complete search history.

(56) References Cited

U.S. PATENT DOCUMENTS

| 10,535,269 | B2 * | 1/2020 | Um ........................ B60W 40/12 |
| 2017/0372612 | A1 | 12/2017 | Bai et al. |
| 2018/0150080 | A1 | 5/2018 | Gross et al. |
| 2018/0174462 | A1 * | 6/2018 | Um ........................ G08G 1/166 |
| 2018/0347991 | A1 | 12/2018 | Titze et al. |

OTHER PUBLICATIONS

International Search Report and Written Opinion for PCT Application No. PCT/US21/62240, dated Apr. 14, 2022, 9 pages.

* cited by examiner

*Primary Examiner* — Jess Whittington
(74) *Attorney, Agent, or Firm* — Lee & Hayes, P.C.

(57) ABSTRACT

A vehicle computing system may implement techniques to improve collision prediction and avoidance between a vehicle and objects in an environment. A vehicle computing system of the vehicle generates a relevance polygon associated with a planned path of the vehicle based at least in part on a speed associated with the vehicle traveling through the environment. The vehicle computing system identifies objects in the environment and determines whether the objects are located within a boundary of the relevance polygon. Based on a determination that an object is within the boundary, the vehicle computing system determines that the object is relevant to the vehicle and includes data associated therewith in vehicle control planning considerations.

19 Claims, 7 Drawing Sheets

VELOCITY-BASED RELEVANCE FILTER

BACKGROUND

Vehicles may be equipped with systems configured to detect and avoid objects in an operating environment. The objects may include mobile objects, such as other vehicles, cyclists, pedestrians, etc. Traditional systems may avoid collisions by identifying the objects in an environment and determining whether to modify a vehicle trajectory based on at least a speed and direction of travel associated with each object. However, calculating the speed and direction of travel of each detected object, in some situations, may require an amount of computing power that results in latency in vehicle planning determinations, thereby potentially degrading safe operation of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
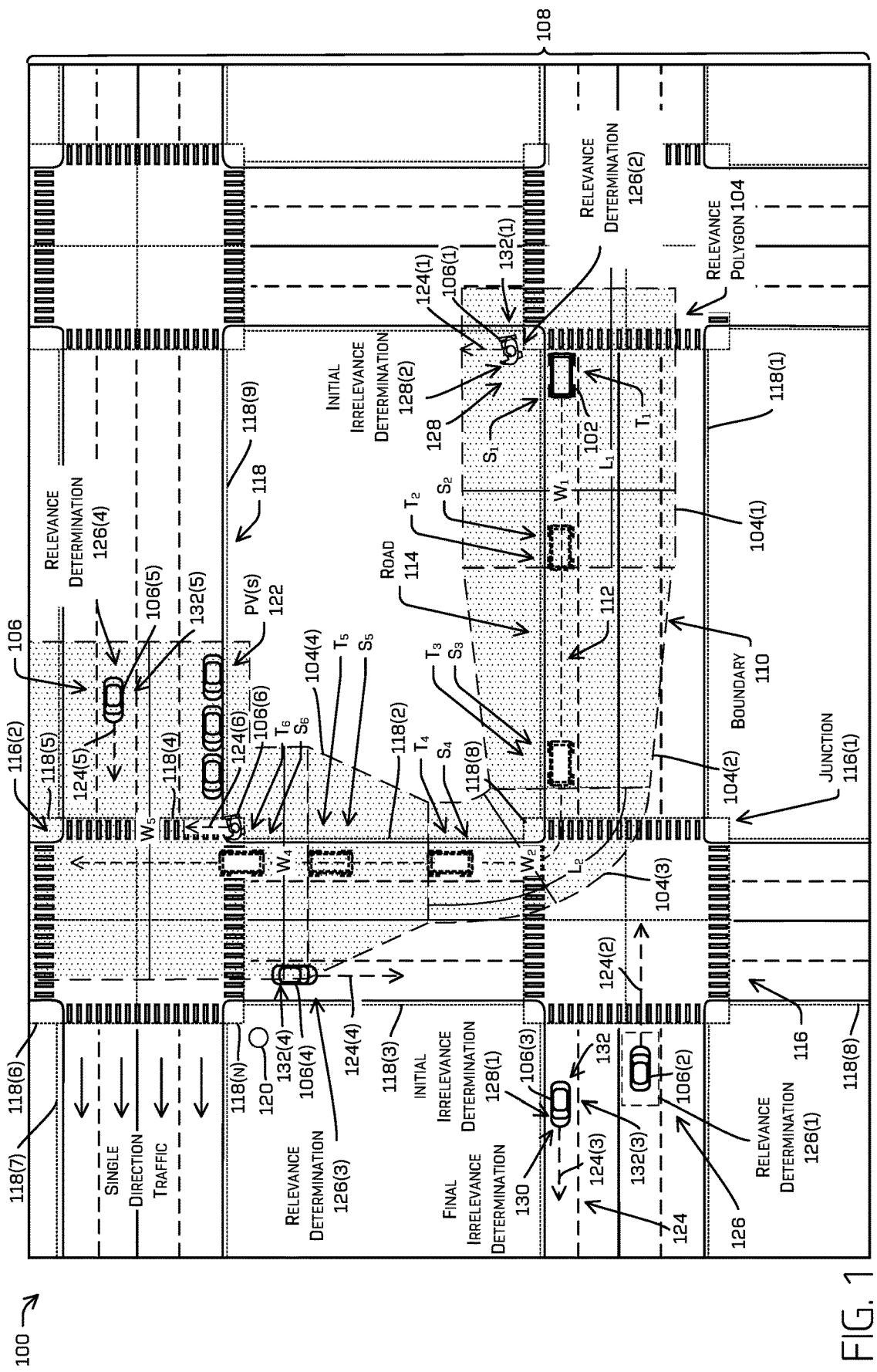
FIG. 1 is an illustration of a vehicle in an environment, wherein a system of the vehicle identifies relevant objects in the environment based in part on an object location relative to a relevance polygon, in accordance with examples of the disclosure.

This disclosure is directed to techniques for improving collision prediction and avoidance between a vehicle and objects in an environment. The vehicle may include an autonomous or semi-autonomous vehicle. The objects may include other vehicles (e.g., cars, trucks, motorcycles, mopeds, etc.), pedestrians, bicyclists, or the like. A vehicle computing system may be configured to generate a relevance polygon associated with a planned path of the vehicle based in part on a speed the vehicle is traveling through the environment. The vehicle computing system may identify objects in the environment and determine whether the objects are located within a boundary of the relevance polygon. Based on a determination that an object is located within the boundary, the vehicle computing system may include data associated with the object in vehicle control planning considerations. Based on a determination that the object is located outside the boundary of the relevance polygon, the vehicle computing system may, in some instances, withhold data associated with the object from at least some vehicle control planning considerations.

The vehicle computing system may be configured to identify objects in the environment. In some examples, the objects may be identified based on sensor data from sensors (e.g., cameras, motion detectors, lidar, radar, etc.) of the vehicle. In some examples, the objects may be identified based on sensor data received from remote sensors, such as, for example, sensors associated with another vehicle or sensors mounted in an environment that are configured to share data with a plurality of vehicles.

The vehicle computing system may determine a location associated with each object identified in the environment. In some examples, a location of an object may include a location relative to the vehicle. In some examples, the location of the object may include a location on a map representative of an environment of the vehicle. In such examples, the vehicle computing system may determine the location utilizing map data, such as that described in U.S. patent application Ser. No. 16/417,260, filed May 20, 2019 and entitled "Object Relevance Determination," the entire contents of which is incorporated herein by reference.

The vehicle computing system may be configured to generate a relevance polygon based on a speed of the vehicle. The relevance polygon represents an area proximate the vehicle in which objects may be relevant to the operation of the vehicle. The relevance polygon may include a length (e.g., longitudinal distance), a width (e.g., lateral distance), and/or a height (e.g., vertical distance) around the vehicle. The length, the width, and/or the height of the relevance polygon may be determined based on the speed of the vehicle. For example, as a speed of the vehicle increases, a length and a width of the relevance polygon may increase. Later, as the speed of the vehicle decreases, the length and the width of the relevance polygon may decrease.

The relevance polygon may be associated with a planned path of the vehicle such that the polygon extends laterally, longitudinally, and/or vertically from a centerline of the vehicle along the planned path. The relevance polygon may extend to a same or different distances laterally from a centerline of the vehicle. The relevance polygon may extend a first distance from a mid-point of the vehicle in a direction of travel (e.g., ahead of the vehicle) and a second distance from the mid-point in a direction opposite the direction of travel (e.g., behind the vehicle). In at least one example, the first distance is greater than the second distance. The relevance polygon may extend a distance vertically from a surface of a road on which the vehicle travels. In at least one example, the distance may be equal to or greater than a height of the vehicle.

In some examples, the relevance polygon may include a minimum volume, such that the relevance polygon extends distances laterally, longitudinally, and/or vertically from the vehicle (e.g., centerline, mid-point, road surface, etc.) to cover the minimum volume at or below a threshold speed (e.g., 10 kilometers per hour (kph), 7 miles per hour (mph), etc.). In some examples, the minimum volume may represent a minimum area for determining relevance of objects proximate the vehicle. For example, the relevance polygon may extend a minimum distance of 10 meters behind the vehicle, 30 meters ahead of the vehicle, 10 meters laterally from either side of the vehicle, and at a height two meters above the road surface from a stopped position of the vehicle (e.g., vehicle speed of 0 mph) to the threshold speed. Above the threshold speed, the lateral, longitudinal, and/or vertical distances may increase. Though this is just an example and is not intended to be so limiting.

In various examples, the relevance polygon determined based on speed may include an initial relevance polygon. In some examples, the vehicle computing system may be configured to modify the initial relevance polygon based on the environment (e.g., map data, road data, etc.) and/or data associated with detected objects operating in the environment. In various examples, the vehicle computing system may determine one or more road segments associated with the planned path of the vehicle. In some examples, the vehicle computing system may identify a road segment of the one or more road segments in which to extend the relevance polygon. In some examples, data associated with an extended relevance polygon may be stored in map data, such as that stored in a datastore and used to determine with the road segment(s). In various examples, the identified road segment may be associated with a particular area of interest, such as an intersection (e.g., junction), in which the vehicle computing system may extend the relevance polygon to track any potentially relevant objects proximate the vehicle. For example, an identified road segment may be associated with an area of reduced visibility, such as, for example, in a blind or semi-blind intersection.

In various examples, the vehicle computing system may determine to modify the relevance polygon, such as to extend the relevance polygon in a particular direction based on an occluded or partially occluded object. In some example, the vehicle computing system may be configured to detect objects utilizing sensor data captured over a period of time. The vehicle computing system may generate a top-down representation of the environment based on the sensor data, such as utilizing the techniques described in U.S. patent application Ser. No. 16/151,607 filed Oct. 4, 2018 and entitled "Trajectory Prediction on Top-Down Scenes," and U.S. patent application Ser. No. 16/504,147 filed Jul. 5, 2019 and entitled "Prediction on Top-Down Scenes based on Action Data," both applications are incorporated herein by reference in their entirety. In various examples, the vehicle computing system may utilize the top-down representation to identify objects that may be at least partially occluded from view of the vehicle. For example, the vehicle computing system may generate a top-down representation of the environment including a first object located abeam and next to the vehicle and a second object located abeam the vehicle, three lanes over, such that the first object substantially blocks a view of the second object from the vehicle (e.g., from sensors of the vehicle).

In various examples, based on a detection of the at least partially occluded object, the vehicle computing system may determine to extend the relevance polygon to include a location of the at least partially occluded object. In some examples, the vehicle computing system may determine to modify the relevance polygon to include the partially occluded object based on a determination that the partially occluded object may interact with another object in the environment. In such examples, a determination to modify the relevance polygon may be based on predicted trajectories associated with the objects. In some examples, the vehicle computing system may be configured to determine one or more predicted trajectories of detected objects utilizing the top-down representation of the environment. In some examples, the vehicle computing system may additionally or alternatively utilize heat maps, tree search methods, and/or temporal logic formulas, such as those described in the U.S. Pat. No. 10,671,076 issued Jun. 2, 2020, entitled "Trajectory Prediction of Third-Party Objects Using Temporal Logic and Tree Search," the entire contents of which are incorporated herein by reference and/or U.S. patent application Ser. No. 15/807,521 filed Nov. 8, 2017, entitled "Probabilistic Heat Maps for Behavior Prediction," the entire contents of each application are incorporated herein by reference.

In some examples, the vehicle computing system may determine a potential interaction between two or more detected objects based on intersecting trajectories associated therewith, such as within a threshold distance of respective object locations. In various examples, a determination of the potential interaction between the two or more detected objects may be based on a determination that the object(s) have associated therewith intersecting trajectories, such that if both continued on respective predicted trajectories, the objects would collide. In various examples, the vehicle computing system may modify the relevance polygon to include the two or more detected objects based on the intersecting trajectories. In such examples, the vehicle computing system modifies the relevance polygon to track data associated with the object interaction, such as a potential collision between the two or more detected objects.

The vehicle computing system may determine whether an object is relevant to the vehicle based on the location of the object relative to the relevance polygon. Based on a determination that an object location associated with the object is on or within a boundary defining the relevance polygon, the vehicle computing system may determine that the object may be relevant to the vehicle. The vehicle computing system may then cause data associated with the object to be processed in vehicle control planning considerations (e.g., control the vehicle at the inclusion of data associated with the object). Based on a determination that the object location associated with the object is outside the boundary defining relevance polygon, the vehicle computing system may determine that the object is irrelevant to at least certain planning decisions of the vehicle. The vehicle computing system may withhold data associated with the irrelevant object from at least some vehicle control planning considerations (e.g., may control the vehicle based on exclusion of data associated with the object). An object may be irrelevant to certain planning decisions and withholding data associated therewith reduces latency of the vehicle planner, thereby enhancing the safe operation of the vehicle. In some examples, an object determined to be irrelevant at a first time may, at a later time, be determined to be relevant based on behavior of the object and/or the vehicle. Additionally, a determination of irrelevance to certain control planning considerations does not imply that the object is irrelevant to other systems or operations of the vehicle. For instance, a redundant safety system of the vehicle may continue to monitor the object that is determined to be irrelevant for certain control planning considerations.

In various examples, a determination of relevance based on the relevance polygon may include a relevance determination in a series of relevance determinations. In some examples, the vehicle computing system may initially determine relevance of detected objects based on predicted trajectories associated therewith, road segments on which the object and the vehicle are located and/or traveling, and the like, such as utilizing techniques described in U.S. patent application Ser. No. 16/135,038, filed Sep. 19, 2018 and entitled "Collision Prediction and Avoidance for Vehicles," U.S. patent application Ser. No. 16/389,720, filed Apr. 19, 2019 and entitled "Dynamic Object Relevance Determination," U.S. patent application Ser. No. 16/417,260, filed May 20, 2019 and entitled "Object Relevance Determination," and U.S. patent application Ser. No. 17/086,047, filed Oct. 30, 2020 and entitled "Collision Avoidance Planning System," the entire contents of each application are incorporated herein by reference. In some examples, the determination of relevance based on the relevance polygon may include a final determination of relevant objects in the environment that could potentially impact the operation of the vehicle. In such examples, the vehicle computing system may utilize the relevance polygon as a final filter for including data associated with potentially relevant objects in vehicle control planning considerations.

The techniques discussed herein may improve a functioning of a vehicle computing device in a number of ways. A vehicle computing system may detect a plurality of objects in an environment, at times up to a mile away from the vehicle. However, processing data associated with the plurality of objects may result in increased latency and control planning concerns due to the latency. As mentioned above, the vehicle computing system determines a relevance polygon associated with the planned path of the vehicle. The vehicle computing system determines that detected objects within the relevance polygon are relevant to the vehicle, whereas detected objects outside the relevance polygon are irrelevant to the vehicle. Based on a determination of irrelevance, the vehicle computing system may withhold data associated with the irrelevant objects from vehicle control planning considerations. At least because the relevance polygon discussed herein decreases a total amount of data processed by the vehicle computing system, the techniques described herein may increase an amount of computing power and memory available for other computations and may substantially improve the functioning of the vehicle computing device. Further, in some examples, the vehicle computing system may be configured to apply compression techniques to the relevance polygon associated with the vehicle. The compression techniques may reduce a number of points in the relevance polygon, thereby reducing a number of calculations that need to be computed to determine whether an object is relevant to the vehicle. These and other improvements to the functioning of the computer are discussed herein and may, in some instances, be achieved using the techniques described herein.

Additionally, as mentioned above, the vehicle computing device may increase and/or decrease a size (e.g., area, volume, etc.) of the relevance polygon based on a speed of the vehicle. For example, as the vehicle accelerates, the relevance polygon increases in size, thereby resulting in the consideration of additional objects in vehicle planning considerations. Based on the inclusion of data associated with the additional objects, the vehicle computing system may ensure the safe operation of the vehicle. As such, the techniques described herein may improve the safe operation of the vehicle.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data). Additionally, the techniques described herein may be used with real data (e.g., captured using sensor(s)), simulated data (e.g., generated by a simulator), or any combination of the two.

FIG. 1 is an illustration of an autonomous (or semi-autonomous) vehicle 102 in an environment 100, wherein a relevance polygon 104 of the autonomous vehicle 102 and a plurality of objects 106 are overlaid in the illustration representing a two-dimensional map 108 of the environment 100 generated by an improved control system of the autonomous vehicle 102 (vehicle 102). A vehicle computing device may perform the improved control system of the vehicle 102. While described as a separate system, in some examples, the control techniques described herein may be implemented by other vehicle systems, components, and/or computing devices. For example, and as will be described in further detail with regard to FIG. 3, the control techniques described herein may be implemented at least partially by or in associated with a planning component 324.

In various examples, the vehicle computing device may generate the relevance polygon 104 of the vehicle 102. As will be discussed in greater detail below with regard to FIG. 2, the relevance polygon 104 may be defined by a plurality of points defining a boundary 110 of the relevance polygon 104. In various examples, the relevance polygon may be associated with a planned path 112 of the vehicle 102 through the environment. In such examples, the relevance polygon 104 may extend laterally, longitudinally, and/or vertically from the planned path 112 of the vehicle 102. In various examples, the relevance polygon 104 extends laterally, longitudinally, and/or vertically from a centerline and/or center point (mid-point) of the vehicle 102.

In the illustrative example of FIG. 1, the lateral extents of the relevance polygon 104 are represented as a width (W) (or set of widths), the longitudinal extents of the relevance polygon 104 are represented as a length (L). As will be discussed in greater detail below, the relevance polygon 104 may extend laterally and/or longitudinally from either side of a centerline of the vehicle 102 at a same distance (e.g., same lateral or longitudinal extent) or a different distance (e.g., different lateral or longitudinal extent). Such extensions may be symmetric about the centerline (having a same width on either side) or asymmetric (having different widths on either side). Though not illustrated in FIG. 1, in some examples, a vertical extent of the relevance polygon 104 may be represented as a height of the relevance polygon 104 from a surface of a road 114 on which the vehicle 102 travels.

In some examples, the width, length, and/or height of the relevance polygon 104 may be determined based on a minimum area (e.g., 100 meters$^2$, 150 feet$^2$) and/or a minimum volume (e.g., 120 meters$^3$, 235 feet$^3$) associated therewith. In such examples, the minimum area may represent a minimum portion of the environment 100 proximate the vehicle 102 in which certain objects 106 are determined to be relevant thereto. In various examples, the minimum area and/or the minimum volume may have associated therewith minimum dimensions. The minimum dimensions may represent a minimum width, length, and/or height of the relevance polygon 104. In some examples, the minimum dimensions may represent a lateral extent on either side of the vehicle, a rear longitudinal extent (e.g., extending behind the vehicle), a front longitudinal extent (e.g., extending ahead of the vehicle), and/or a vertical extent. For example, the minimum dimensions may include a lateral extent of about 8 meters on either side of the vehicle 102, a rear longitudinal extent of about 11 meters behind the vehicle 102, and a front longitudinal extent of about 32 meters ahead of the vehicle 102. In various examples, the vehicle computing system may store the minimum area and/or volume and associated dimensions in a datastore associated therewith.

In various examples, the dimensions (e.g., width, length, and/or height) of the relevance polygon 104 may be determined based on a speed (illustrated as S) associated with the vehicle 102. For example, a first width ($W_1$) and a first length ($L_1$) of a first relevance polygon 104(1), may be determined based on a first speed of the vehicle 102 ($S_1$) at a first time ($T_1$) and a second width ($W_2$) and a second length ($L_2$) of a third relevance polygon 104(3) may be determined based on a third speed of the vehicle 102 ($S_3$) at a third time ($T_3$). In at least one example, the minimum area and/or volume of the relevance polygon 104 may be maintained at or below a threshold speed (e.g., 6 kph, 9 mph, etc.). In such an example, based on a determination that the vehicle 102 is traveling at or below the threshold speed, the vehicle computing system may maintain the minimum dimensions of the relevance polygon 104, such as to maintain the minimum area and/or volume thereof. For example, the vehicle computing system may determine that the planned path 112 of the vehicle 102 includes a right turn at a junction 116, such as junction 116(1). The vehicle computing system may determine that a speed ($S_3$) associated with the vehicle navigating the right turn is at or below the threshold speed. Based on the determination that the vehicle is traveling and/or will travel at or below the threshold speed at a time ($T_3$) associated with the turning maneuver, the vehicle computing system may generate the third relevance polygon 104(3) including the minimum dimensions associated with the minimum area and/or volume. In at least one example, a minimum lateral extent of the relevance polygon 104 may include 20 meters on either side of the vehicle 102 and a longitudinal extent of the relevance polygon 104 may include a rear extent of 10 meters behind the vehicle and a forward extent of 50 meters.

In various examples, based on a determination that a speed of the vehicle 102 is above the threshold speed, the vehicle computing system may increase a width, length, and/or height of the relevance polygon 104. In various examples, the vehicle computing system may increase the width, length, and/or height of the relevance polygon 104 periodically, such as every tenth of a second or the like. In such examples, the dimensions of the relevance polygon 104 may increase in a stepwise manner, based on the periodicity. In some examples, the vehicle computing system may increase the width, length, and/or height of the relevance polygon 104 continuously, such that the dimensions of the relevance polygon 104 increase consistently during acceleration. For example, vehicle computing system may determine that a fourth speed ($S_4$) of the vehicle 102 at a fourth time ($T_4$) is above the threshold speed and that the vehicle 102 is accelerating or will accelerate to a fifth speed ($S_5$) at a fifth time ($T_5$). The vehicle computing system may continually increase the dimensions of the relevance polygon 104(5) based on the acceleration and the speeds associated therewith (e.g., illustrated as an outwardly tapering relevance polygon 104(4). In at least one example, the vehicle computing system may increase the width utilizing the following formula: width=(0.5×S×10 seconds), where S is the speed of the vehicle 102. In some examples, the width may be limited within the bounds of a minimum width (e.g., 20 meters, 30 feet, etc.) and a maximum width (e.g., 40 meters, 60 feet, etc.). In at least one example, the vehicle computing system may increase the length and/or forward lateral extent of the relevance polygon based on the following: (S×10 seconds, 50 m), where S is the speed of the vehicle and 50 m represents a minimum length and/or forward extent of 50 meters.

In various examples, the relevance polygon 104 may include one or more maximum dimensions. In such examples, the relevance polygon 104 may include a maximum lateral extent, longitudinal extent, and/or vertical extent. For example, the vehicle computing system may increase a lateral extent of the relevance polygon 104 to a maximum lateral extent of 20 meters on either side of the vehicle 102, though this is merely for illustrative purposes and is not intended to be so limiting.

Additionally, the vehicle computing system may determine that the vehicle 102 is slowing and/or is planning to slow a forward speed at a particular time. The vehicle computing system may decrease the width, length, and/or height of the relevance polygon based on the speeds associated with the negative acceleration (e.g., slowing). The vehicle computing system may decrease the dimensions in a stepwise manner and/or consistently throughout the negative acceleration, such as described above with regard to the positive acceleration. Continuing the example from above with regard to the vehicle 102 turning right at the junction 116(1), the vehicle computing system may determine to slow from the second speed ($S_2$) to the third speed ($S_3$) to affect the turning maneuver. In some examples, the third speed ($S_3$) may be determined based on a maximum turning acceleration, a predetermined speed for a 90 degree turn at an intersection, or the like. The vehicle computing system may determine a time ($T_2$) associated with the negative acceleration and may continually decrease the size of the relevance polygon 104(2) based on the decreasing speeds from the second speed ($S_2$) to the third speed ($S_3$). As described above, the vehicle computing system may determine that the third speed ($S_3$) and/or any subsequent speeds associated with the turning maneuver are at or below the threshold speed. Based on the determination that the third speed ($S_3$) is below the threshold speed, the vehicle computing system may maintain a minimum size of the relevance polygon 104(3).

In various examples, the width (W) of a relevance polygon 104 may be centered on the planned path 112 of the vehicle. In such examples, the relevance polygon 104 may extend laterally in equal distances from a centerline of the vehicle 102. In various examples, the vehicle computing system may center the relevance polygon on the planned path 112 and/or centerline of the vehicle 102 as a default setting. In some examples, the vehicle computing system may determine that a first lateral extent of the relevance polygon 104 on a first side of the vehicle (e.g., left side or right side) is different from a second lateral extent of the relevance polygon 104 on a second side of the vehicle 102. In such examples, the width of the relevance polygon may be off center from the planned path 112 and/or centerline of the vehicle 102. For example, a first width ($W_1$) of the first relevance polygon 104(1) may extend in equal distances from the planned path 112 and the centerline of the vehicle 102, and fifth width ($W_5$) associated with a fifth relevance polygon 104(5) may extend in different distances on opposing side of the planned path 112 and the centerline of the vehicle 102.

In various examples, the vehicle computing system may generate an initial relevance polygon 104 based on the speed of the vehicle 102. In some examples, the initial relevance polygon 104 may include an area and/or volume associated with the speed that is substantially laterally centered about the planned path and/or centerline of the vehicle 102. In various examples, the initial relevance polygon 104 may include an initial front longitudinal distance and a rear longitudinal distance based on the speed. In various examples, the vehicle computing system may determine to modify the width and/or length of the initial relevance polygon 104. In various examples, a modification to the width and/or length may result in different lateral and/or longitudinal extents of the relevance polygon 104. For example, the vehicle computing system may determine to modify a fourth relevance polygon 104(5) from a fourth width ($W_4$) centered about the planned path 112 and/or centerline of the vehicle 102 to a fifth width ($W_5$) extending to the right of the vehicle 102 at a greater lateral distance than the lateral distance extending to the left of the vehicle 102.

In various examples, the vehicle computing system may be configured to modify one or more dimensions of the relevance polygon 104 based on map data associated with the environment 100. In various examples, the map data may include one or more junctions 116 and/or one or more road segments 118 corresponding to the road 114 associated with the planned path 112 of the vehicle. In some examples, the map data may include additional junctions 116 and/or road segments 118 associated with one or more other roads, such as other roads that cross above or below the road 114 associated with the vehicle 102. In some examples, the junction(s) 116 and/or road segment(s) 118 included in the map data may be associated with a road network on which the vehicle 102 may operate autonomously. In various examples, the road segment(s) 118 may be defined by a reference line that follows the movement of the road 114 (e.g., curves, straight portions, etc.) and an offset therefrom. In some examples, each of the road segments 118(1), 118(2), 118(3), 118(4), 118(5), 118(6), 118(7), 118(8), . . . 118(N) may have associated therewith a unique identifier. In the illustrative example, the road segment(s) 118 may include a drivable surface of a road for vehicles operating in a single direction, such as road segments 118(2), 118(3), and 118(7), in both directions, such as road segments 118(1) and 118(8). In various examples, junctions 116(1) and 116(2) may include one or more road segments 118. In the illustrative example, junctions 116(1) and 116(2) each include four road segments, such as road segments 118(4), 118(5), 118(6), and 118(N) of junction 116(2), though this is merely for illustrative purposes and a greater or lesser number of road segments 118 per junction may be contemplated.

In various examples, the map data may include an indication that one or more of the junctions 116 and/or road segment(s) 118 may have associated therewith an indication to modify a relevance polygon 104 at or around the junction 116 and/or the road segment(s) 118. In some examples, the indication may be based on a speed limit, a known amount of traffic, a time of day, a day of the week, a zone (e.g., school zone, etc.), an indication of a blind or semi-blind intersection, or other factors associated with the junction(s) 116 and/or road segment(s) 118 that may affect the safe operation of the vehicle 102. In various examples, the vehicle computing system may modify the width of a relevance polygon 104 proximate the junction(s) 116 and/or road segment(s) 118 based on the indication. For example, the map data may include an indication that a second junction 116(2) is associated with a speed limit above a threshold speed limit. Based on the speed limit being above the threshold speed limit, the vehicle computing system may modify the fifth relevance polygon 104(5) to extend a lateral distance of the fifth relevance polygon 104(5) from a fourth width ($W_4$) to a fifth width ($W_5$), extending a greater distance toward oncoming traffic.

In various examples, the vehicle computing system may be configured to modify one or more dimensions of the relevance polygon 104 based on an identification of an object 106 that is occluded or partially occluded from view of the vehicle 102. In some example, the vehicle computing system may be configured to detect objects utilizing sensor data captured by one or more sensors. In some examples, the sensor(s) may include sensors mounted on the vehicle 102, such as, for examples, cameras, motion detectors, lidar, radar, etc. In some examples, the sensor(s) may include one or more remote sensors, such as, for example sensors mounted on another vehicle 102, and/or sensors 120 mounted in the environment 100. In various examples, the vehicle 102 may be configured to transmit and/or receive data from the other vehicles 102 and/or sensors 120. The data may include sensor data, such data regarding object(s) 106. In various examples, the environment 100 may include sensors 120 for traffic monitoring, collision avoidance, or the like. In some examples, the sensors 120 may be mounted in the environment 100 to provide additional visibility in an area of reduced visibility, such as, for example, in a blind or semi-blind intersection. For example, the junction 116(2) may be determined to have a blind intersection, where approaching vehicles 102 may not be able to perceive objects 106 and/or other vehicles approaching from the left or right on the intersecting road. The junction 116(2) may thus include a sensor 120 to provide sensor data to an approaching vehicle 102 regarding an object 106(5) approaching the intersection from the intersecting road.

In various examples, the vehicle computing system may generate a top-down representation of the environment based on the sensor data, such as utilizing the techniques described in U.S. patent application Ser. No. 16/151,607 and U.S. patent application Ser. No. 16/504,147, incorporated herein by reference above in their entirety. In various examples, the vehicle computing system may utilize the top-down representation to identify objects 106 that may be at least partially occluded from view of the vehicle. For example, the vehicle computing system may generate a top-down representation of the environment including an occluded object 106, such as object 106(5) located on a road segment 118(9) with one or more parked vehicles 122 (PVs 122) that substantially block a view of the object 106(5) from the vehicle 102 (e.g., from sensors of the vehicle).

In some examples, the vehicle computing system may determine the occluded object 106(5) utilizing ray tracing techniques in association with the top-down representation. In various examples, the vehicle computing system may detect other objects 106 and or PVs 122 based on direct returns from a sensor, such as a lidar sensor. For example, the vehicle computing system may emit a beam of light and receive a return from the PVs 122, indicating the presence thereof in the environment 100. In various examples, the vehicle computing system can simulate extending the beam of light through the PVs 122 to detect and/or track another object located behind and substantially occluded by the PVs 122, such as the object 106(5). In some examples, the vehicle computing system may utilize indirect returns from the sensors (e.g., simulated extensions of beams of light) and direct returns from the sensors, such as beams of light that travel between the PVs 122, behind the PVs 122, and the like. In various examples, the vehicle computing system may be configured to detect and track the occluded object 106(5) utilizing a combination of the direct and indirect returns.

Additionally or in the alternative, the vehicle computing system may determine the occluded object utilizing techniques described in U.S. patent application Ser. No. 16/011,436, filed Jun. 18, 2018 and entitled "Occlusion Aware Planning," and filed Jun. 18, 2018 and U.S. patent application Ser. No. 16/246,208, filed Jan. 11, 2019 and entitled "Occlusion Prediction and Trajectory Evaluation," both of which are incorporated herein by reference in their entirety.

In various examples, the vehicle computing system may be configured to modify one or more dimensions of the relevance polygon 104 based on a detection of an occluded object 106(5). Based on a determination that the occluded object 106(5) is located and/or traveling on the road segment 118(9) and/or that a portion of the road segment 118(9) is substantially occluded by the PVs 122, the vehicle computing system may determine to modify the dimensions of the relevance polygon 104(5) to include the occluded object 106(5) and/or the PVs 122. For example, the vehicle computing system may detect the occluded object 106(5) and/or may determine that the PVs 122 substantially block a view of a portion of the road segment 118(9) and may extend the width of the relevance polygon 104(5) from the fourth width ($W_4$), determined based on a speed of the vehicle 102, to a fifth width ($W_5$), determined based on the speed of the vehicle 102 and the occlusion.

Additionally or in the alternative, the vehicle computing system may determine to modify the dimensions of the relevance polygon 104 based on one or more predicted object trajectories 124. The vehicle computing system may be configured to determine one or more predicted trajectories 124 based on the top down representation of the environment 100 described above. In some examples, the vehicle computing system may utilize heat maps, tree search methods, and/or temporal logic formulas, such as those described in the U.S. patent application Ser. No. 15/833,715 and/or U.S. patent application Ser. No. 15/807,521, the entire contents of both applications are incorporated herein by reference above.

In various examples, the vehicle computing system may determine one or more potential object interactions based on the one or more predicted trajectories thereof. In various examples, the potential object interactions may include potential collisions between objects 106, modifications to velocities (e.g., speed and/or direction of travel) associated therewith, and the like. In various examples, due in part to the potential affect the object interactions may have on the vehicle 102, the vehicle computing system may process data associated with objects 106 associated with a potential object interaction.

In various examples, the vehicle computing system may determine the potential object interaction(s) based on a determination that predicted object trajectories 124 associated with two or more objects 106 intersect. In some examples, the vehicle computing system determines the potential object interaction(s) based on a determination that an intersection between the predicted object trajectories 124 is within a threshold distance of one or more of the objects 106. In such examples, the vehicle computing system may determine that, absent a modification to one or more of the associated object trajectories 124, the objects 106 may collide. In various examples, the threshold distance may be determined based on an object speed associated with one or more of the objects. In such examples, the threshold distance may increase as the object speed increases. In some examples, the threshold distance may be determined based on a type of object 106. In some examples, the vehicle computing system may be configured to determine a type (e.g., classification) of detected objects 106 (e.g., car, truck, pedestrian, bicyclist, etc.) and determine the threshold distance based on the type of object 106.

In various examples, the vehicle computing system may determine the potential object interaction(s) based on a determination that the predicted object trajectories 124 are substantially orthogonal. For example, the vehicle computing system may detect the fifth object 106(5) at a fifth object location 132(5) and a direction associated with a fifth object trajectory 124(5) associated therewith. The vehicle computing system may detect the sixth object 106(6) and may determine that a direction associated with the sixth object trajectory 124(6) is substantially orthogonal to the direction associated with the fifth object trajectory 124(5). Based on the determination of substantially orthogonal trajectories, the vehicle computing system may determine that a potential object interaction may occur.

In some examples, based on a determination that the potential object interaction may occur, the vehicle computing system may modify one or more dimensions of the relevance polygon 104 to include the objects 106 associated with the potential object interaction. Continuing the example from above with the orthogonal object trajectories 124(5) and 124(6), the vehicle computing system may extend a width of the relevance polygon 104(5) from the fourth width ($W_4$), determined based on a speed of the vehicle 102, to a fifth width ($W_5$), determined based on the speed of the vehicle 102 and the potential object interaction. Additionally or in the alternative, the vehicle computing system may modify one or more dimensions of the relevance polygon 104 based on the vehicle trajectory associated with the planned path 112. For example, the vehicle trajectory and/or planned path 112 may include a right turn at the junction 116(1). Based on the right turn, the vehicle computing system may increase a right and/or left extent of the relevance polygon 104(3) associated with the turn, such as to identify additional potentially relevant objects 106 to the vehicle 102.

In various examples, the vehicle computing system may utilize the relevance polygon 104 (initial and/or modified) to identify one or more relevant objects 106 located in the environment 100. In various examples, the vehicle computing system may determine that objects 106 located within the boundary 110 of the relevance polygon 104 are relevant to the vehicle 102. In some examples, the relevance determination associated with the relevance polygon 104 may override an initial determination of irrelevance with respect to the objects 106 (e.g., initial irrelevance determination 128).

In various examples, the vehicle computing system may process object data (e.g., predicted trajectory, type, etc.) associated with the objects 106, such as the object trajectories 124, road segments 118 on which the object 106 travels, and the like, to make a relevance determination 126 associated with an object 106. The vehicle computing system may determine the relevance determination 126 utilizing techniques described in U.S. patent application Ser. Nos. 16/135,038, 16/389,720, 16/417,260, and 17/086,047 the entire contents of which are incorporated herein by reference above in their entirety. For example, the vehicle computing system may detect a second object 106(2) located on the road 114 on which the vehicle 102 is operating. The vehicle computing system may determine, based on a second object trajectory 124(2) associated with the second object 106(2) that the second object 106(2) is relevant to the vehicle 102 (e.g., relevance determination 126(1)). Based on the relevance determination 126(1), the vehicle computing system may include object data associated with the object 106(2) in vehicle planning considerations.

In various examples, the vehicle computing system may process the object data associated with the object trajectories 124, road segments 118 on which the object 106 travels and the like and make an initial irrelevance determination 128. The initial irrelevance determination may represent an initial determination that a detected object 106 is not relevant to the vehicle 102. For example, based on a determination that the third object 106(3) is traveling away from the vehicle 102 on a third object trajectory 124(3) that diverges from the planned path 112 of the vehicle 102, the vehicle computing system may make an initial irrelevance determination 128(1) that the third object 106(3) is not relevant to the vehicle.

Responsive to the initial irrelevance determination 128, the vehicle computing system may determine a final relevance determination 126 based on the relevance polygon 104. The final relevance determination 126 may be based at least in part on an object location 132 associated with the object 106 relative to the relevance polygon 104. In various examples, the vehicle computing system may determine the object location 132 associated with an object 106, such as object location 132(3) associated with object 106(3). In some examples, the vehicle computing system may determine whether the object location 132 is associated with the relevance polygon 104. The object location 132 may be associated with the relevance polygon 104 based on a determination that the object location 132 is located at or within a boundary 110 defining the relevance polygon 104.

In some examples, based on a determination that the object location is not associated with the relevance polygon 104, the vehicle computing system may generate a final irrelevance determination 130, such as final irrelevance determination 130(1). In such examples, the vehicle computing system may withhold data associated with the irrelevant object 106 from vehicle planning considerations. Continuing the example from above, the vehicle computing system may determine whether the third object location 132(3) associated with the third object 106(3) is at or within the boundary 110 of the relevance polygon 104. Based on a determination that the third object location 132(3) is not within the boundary 110 of the relevance polygon 104, the vehicle computing system may withhold data associated with the third object 106(3) from vehicle planning considerations (e.g., control the vehicle 102 based on (at the) exclusion of data associated with the third object 106(3)). In various examples, withholding data associated with the third object 106(3) may include not providing the data to a vehicle planning system, such as planner component 324 of FIG. 3. In some examples, withholding the data may include not using the data in vehicle control planning considerations, such as the vehicle computing system determining an action for the vehicle to take based on an exclusion of data associated with the object 106(3).

In some examples, based on a determination that the object location 132 is associated with the relevance polygon 104 (e.g., within the boundary 110), the vehicle computing system may determine that the object 106 is relevant to the vehicle 102 in a relevance determination 126. In some examples, the relevance determination 126 based on the object location 132 may include a final relevance determination 126. Based at least in part on the final relevance determination 126, the vehicle computing system may include data associated with the relevant object in control planning considerations (e.g., control the vehicle 102 based on inclusion of data associated with the relevant object). For example, the vehicle computing system may detect a first object 106(1) based on the sensor data. The vehicle computing system may determine an initial irrelevance determination 128(2) associated with the first object 106(1), based at least in part on the first object trajectory 124(1). The vehicle computing system may determine that a first object location 132(1) of the first object 106(1) is associated with the relevance polygon 104(1). Based on determination that the first object location 132(1) is associated with the relevance polygon 104(1), the vehicle computing system may determine that the first object 106(1) is relevant to the vehicle 102, such as in a second relevance determination 126(2). Based on the second relevance determination 126(2), the vehicle computing system may include data associated with the first object 106(1) in vehicle control planning considerations. For another example, the vehicle computing system may detect a fourth object 106(4), such as at or around a fourth time ($T_4$), at a fourth object location 132(4). The vehicle computing system may determine an initial irrelevance determination 128(2) associated with the fourth object 106(4), based at least in part on the fourth object trajectory 124(4). The vehicle computing system may determine that the fourth object location 132(4) of the fourth object 106(4) is associated with the relevance polygon 104(4). Based on determination that the fourth object location 132(4) is associated with the relevance polygon 104(4), the vehicle computing system may determine that the fourth object 106(4) is relevant to the vehicle 102, such as in a third relevance determination 126(3). Based on the third relevance determination 126(3), the vehicle computing system may include data associated with the fourth object 106(4) in vehicle control planning considerations.

As discussed above, the vehicle computing system may modify the relevance polygon 104 from an initial relevance polygon 104, the dimensions of which are determined based on the speed of the vehicle 102, to a modified relevance polygon 104, such as relevance polygon 104(5). As described above, the vehicle computing system may determine to modify the relevance polygon 104(5) based on a detection of an occluded object 106, such as the fifth object 106(5) and/or based on potential object interactions between two objects, such as objects 106(5) and 106(6). In some examples, responsive to determining to modify the relevance polygon 104(5) to include the fifth object 106(5), the vehicle computing system may determine that the fifth object 106(5) is relevant to the vehicle 102, such as in a fourth relevance determination 126(4). Based on the fourth relevance determination 126(4), the vehicle computing system may include data associated with the fifth object 106(5) in vehicle control planning considerations. In examples in which the vehicle computing system determines the potential object interaction between two objects 106, such as fifth object 106(5) and sixth object 106(6), the vehicle computing system may determine to include data associated with both objects 106(5) and 106(6) associated with the potential object interaction in vehicle control planning considerations. In such examples, the vehicle computing system may determine the fourth relevance determination 126(4) associated with the fifth object 106(5) and a fifth relevance determination (not illustrated) associated with the sixth object 106(6).

Figure 2:
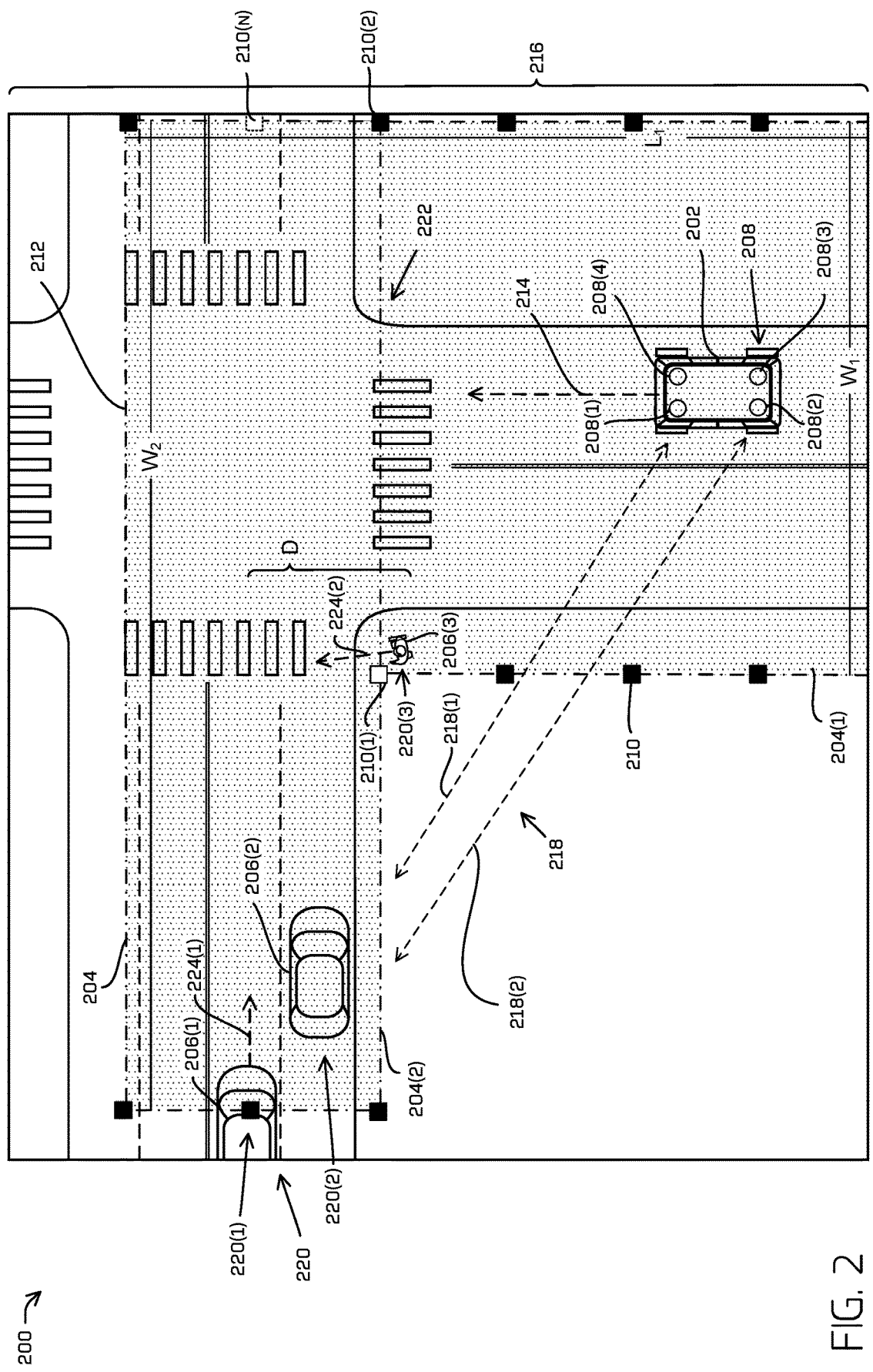
FIG. 2 is an illustration of a vehicle in an environment, wherein a control system of the vehicle modifies a dimension of a relevance polygon based on one or more detected objects, in accordance with examples of the disclosure.

FIG. 2 is an illustration of an environment 200, such as environment 100, wherein a control system of a vehicle 202, such as vehicle 102, may determine to modify a relevance polygon 204, such as relevance polygon 104, based on a detection of one or more objects 206, such as objects 106. In some examples, a vehicle computing system of the vehicle 202 may determine to modify the relevance polygon 204 based on a determination that an object 206 is occluded from view of one or more sensors 208 of the vehicle 102, such as occluded object 206(1).

As discussed above, the vehicle computing system may generate the relevance polygon 204 based on a speed of the vehicle 202. In various examples, the relevance polygon 204 may include an initial relevance polygon 204(1). In such examples, the relevance polygon 204 may include dimensions based on the speed of the vehicle. For example, the initial relevance polygon 204(1) may include a width ($W_1$), a length ($L_1$), and a height (not illustrated).

In some examples, the vehicle computing system may determine the dimensions based on a volume and/or area associated with the initial relevance polygon 204(1). In some examples, the volume and/or area covered by the initial relevance polygon 204(1) may increase/decrease as the speed increases/decreases, such as by a scaling factor (e.g., times 1.2, 1.5, etc.). In some examples, each dimension (width, length, and/or height) of the initial relevance polygon 204(1) may increase/decrease by the scaling factor as the speed increases/decreases. In various examples, map geometry may be used to limit such expansion (e.g., by maintaining expansion laterally or longitudinally to areas associated with lanes, drivable areas, or up to a static object such as a building).

In various examples, the relevance polygon 204 (e.g., initial relevance polygon 204(1) and modified relevance polygon 204(2)) may be defined by a plurality of points 210. In various examples, the relevance polygon 204 may be represented as pairs of points 210, though any number of individual points are contemplated. In some examples, the relevance polygon 204 may comprise a region formed by connecting individual points of the pairs of points 210 to define a boundary 212 of the relevance polygon 204, such as boundary 110. In some examples, a length of the relevance polygon 204, such as length ($L_1$) may be associated with a time horizon. In some examples, a length of the relevance polygon 204 may be associated with a minimum volume, minimum area, and/or minimum longitudinal extent of the relevance polygon 204 (e.g., distance ahead of and/or behind the vehicle 202).

In various examples, a position of the left and right points 210 of a point pair may be individually adjusted based on a maneuver of the vehicle 102, such as, for example a turn. For example, responsive to a determination that a planned path 214 of the vehicle, such as planned path 112, included a turn, the vehicle computing system may determine that a left point, such as left point 210(1) or right point, such as right point 210(2) of a point pair may be adjusted outward a distance (e.g., 3 inches, 5 inches, 8 inches, etc.) based on the maneuver. In various examples, the left or the right points 210 may be adjusted outward the distance based on a radius of curvature associated with a turn. For example, in a 45-degree right turn, a right point 210 of the point pair may be adjusted outward a distance to account for an additional space the vehicle 202 may occupy as the vehicle 202 travels through the turn.

In various examples, the pairs of points 210 may be represented in a two-dimensional map 216 of the environment 200, such as map 108 at consistent intervals with respect to time (e.g., 0.2 second intervals, 0.5 second intervals, etc.). In various examples, the map 216 may represent a top-down representation of the environment 200, such as that generated by the vehicle computing system. In some examples, the pairs of points 210 may be represented on the map 216 at varying intervals. In various examples, the pairs of points 210 may be represented at equal distances in length (e.g., length along the path) from one another. In such examples, each left/right point 210 of a point pair may be at a pre-defined distance (e.g., 1 meter, 3 feet, 18 inches, etc.) from the next left/right point 210 of the point pair. In some examples, the pairs of points 210 may be represented at different distances in length from one another. In various examples, the distances may be determined based on a maneuver of the vehicle 202, a speed of the vehicle 202, a density of traffic in the environment 200, and/or other factors impacting the vehicle 202.

In various examples, the vehicle computing system may be configured to perform compression techniques on the relevance polygon 204. In such examples, the vehicle computing system may be configured to improve the speed and function of the vehicle computing system itself and the control system by removing points 210 from calculations. In some examples, the vehicle computing system may determine that removing a point 210, such as 210(N), may have no effect or a negligible effect on an area and/or volume associated with the relevance polygon 204. The area of the relevance polygon 204 may be a two-dimensional area (e.g., meters$^2$, feet$^2$, inches$^2$, etc.). The volume of the relevance polygon 204 may be a three-dimensional area (e.g., meters$^3$, feet$^3$, inches$^3$, etc.), such as that accounting for a height or vertical extent of the relevance polygon 204. In some examples, the vehicle computing system may determine that removing the point 210(N) may modify the area and/or volume less than a threshold amount. The threshold amount may be a percentage of the total area and/or volume (e.g., 3%, 5%, 10%, etc.) and/or it may be a pre-defined amount of area and/or volume (e.g., 2.5 meters, 2 feet, 27 inches' etc.). As illustrated in FIG. 2, the vehicle computing system may determine that removing the point 210(N) would have little or no effect on the area of the relevance polygon 204. Thus, the vehicle computing device may remove the point 210(N) from calculations, thereby reducing the complexity of the calculations and improving the functioning of the vehicle computing device.

In various examples, the vehicle computing system may determine that a point 210 in the relevance polygon 204 is associated with a modification to the relevance polygon 204, such as point 210(1). In such examples, the point 210(1) may include the point 210 at which the relevance polygon 204 is modified and on the side (e.g., left/right) associated with the modification. In some examples, the vehicle computing system may determine that removing the point 210 would have little to no effect on an area and/or volume of the modified relevance polygon 204(2). In such examples, the vehicle computing system may remove the point 210(1) from calculations. In some examples, the vehicle computing system may determine that removing the point 210(1) would have an effect on the area and/or volume and may include the point 210(1) in calculations. For example, the point 210(1) includes a point that is initially determined as defining a boundary of the initial relevance polygon 204(1). Based on a determination to modify the relevance polygon 204(1), the vehicle computing system generates another point 210(3) as a left boundary of the modified relevance polygon 204(2) (e.g., as a pair with 210(2)). The vehicle computing system determines that a removal of the original left point 210(1) would modify the area and/or volume of the modified relevance polygon 204(2) greater than a threshold and determines to include the point in calculations (e.g., not remove the point 210(1)).

As discussed above, the vehicle computing system may determine to modify the initial relevance polygon 204(1) based on map data, one or more objects 206 detected in the environment, and/or a potential interaction between the objects 206. In various examples, the vehicle computing system may determine to modify the initial relevance polygon 204(1) to include an object 206 that is at least partially blocked from direct view of the vehicle 102, such as first object 206(1) (e.g., occluded object 206(1)). In such an example, the vehicle computing system may ensure to include object data associated with objects 206 that could potentially be relevant to the vehicle 202 but may not necessarily be directly in view (of the sensors 208) thereof.

In various examples, the vehicle computing system may determine that the first object 206(1) is located behind the second object 206(2) utilizing ray tracing techniques in association with the top-down representation (e.g., map 216). In various examples, the vehicle computing system may detect the second object 206(2) based on first signals 218 transmitted and/or received by a first sensor 208(1) and/or second signals 218(2) transmitted and/or received by a second sensor 208(2). Though not illustrated, one or more objects may additionally or alternatively be detected utilizing signals 218 transmitted and/or received by a third sensor 208(3) and/or a fourth sensor 208(4) of the vehicle 202. For example, the first sensor 208(1) may include a lidar sensor that emits a beam of light as a first signal 218(1). The first sensor 208(1) may receive a return from the first signal 218(1) and determine that the second object 206(2) is present in the environment. In some examples, based on the returns from the signals 218, the vehicle computing system may be configured to determine an object type (e.g., car, vehicle, truck, tractor trailer, bicyclist, pedestrian, etc.) associated with the object 206(2).

In various examples, responsive to a determination that the second object 206(2) is present in the environment 200, the vehicle computing system may simulate extending a signal 218 beyond the second object 206(2), such as to detect the occluded object 206(1) that is at least partially blocked by the second object 206(2). In some examples, the vehicle computing system may utilize the simulated signals (e.g., indirect signals) combined with direct signals 218 (e.g., sent by and received from the sensors 208) to determine that the first object 206(1) is located behind the second object 206(1). For example, the vehicle computing system may receive, at a first time, a return associated with a first signal 218(1). The vehicle computing system may determine that the return was associated with surface (e.g., of an object, obstacle, etc.). However, the data associated with the return may be insufficient to identify the detected surface as the first object 206(1). The vehicle computing system may simulate additional signals 218 extending through the second object 206(2) to determine that the first object 206(1) is located behind the second object 206(2). For another example, the vehicle computing system may process data captured by one or more remote sensors in the environment 200, such as sensor(s) on other vehicles, sensors mounted in the environment 200, and the like. In various examples, the additional sensor data may be used to detect and/or characterize (e.g., determine an object type) the first object 206(1).

In some examples, based on a determination that the occluded object 206(1) is located behind a second object 206(2), the vehicle computing system may determine to modify the dimensions of the initial relevance polygon 204(1) to include an object location 220, such as object location 220(1) associated with the occluded object 206(1). In the illustrative example, the vehicle computing system determines to modify a width of the relevance polygon 204 from a first width ($W_1$) to a second width ($W_2$), such as to include at least a portion of the occluded object 206(1). However, this is merely for illustrative purposes and is not intended to be so limiting. For example, the vehicle computing system may determine to modify the width, length, and/or height of the relevance polygon 204.

In various examples, the vehicle computing system may determine to modify the dimensions of the initial relevance polygon 204(1) based on an object type associated with the occluded object 206(1). In such examples, the vehicle computing system may be configured to determine the object type associated with the occluded object 206(1). In some examples, a determination to modify the relevance polygon 204 may be based on the object type associated with the occluded object 206(1) and/or the second object 206(2). For example, based on a determination that the occluded object 206(1) is a tractor-trailer that requires a significant distance to slow to a stop (e.g., such as to stop at or before a junction 222, the vehicle computing system may determine to modify the relevance polygon 204, such as to include data associated with the occluded object 206(1). For another example, based on a determination that the occluded object 206(1) is a pedestrian jay walking behind the second object 206(2), the vehicle computing system may determine to not modify the relevance polygon 204.

Additionally or in the alternative, the vehicle computing system may determine to modify the dimensions of the relevance polygon 104 based on one or more predicted object trajectories 224. As discussed above, the vehicle computing system may be configured to determine the predicted trajectories 224 utilizing the top-down representation of the environment 200, heat maps, tree search methods, and/or temporal logic formulas.

In various examples, the vehicle computing system may determine one or more potential object interactions based on the one or more predicted trajectories 224 thereof. In various examples, the potential object interactions may include potential collisions between objects 206, modifications to velocities (e.g., speed and/or direction of travel) associated therewith, and the like. In various examples, the vehicle computing system may determine the potential object interaction(s) based on a determination that predicted object trajectories 224 associated with two or more objects 206 intersect. In some examples, the vehicle computing system may determine that object interaction based on a determination that the associated object trajectories 224 are substantially perpendicular (e.g., within 30 degrees of a right angle, 60-120 degrees relative to one another). In some examples, the determination of substantial perpendicularity may represent a likelihood of collision between the associated objects 206 above a threshold likelihood. For example, the vehicle computing system may determine that a first object trajectory 224(1) associated with the first object 206(1) is substantially perpendicular to a second object trajectory 224(2) associated with the third object 206(3). Based on the determination of substantial perpendicularity (e.g., a likelihood of collision being above the threshold), the vehicle computing system may determine to modify the relevance polygon 204 to include the first object 206(1). Accordingly, the vehicle computing system may include object data associated with the first object 206(1) in control planning considerations, such as to determine a resulting object interaction between the objects 206(1) and 206(3) and/or to determine an action for the vehicle 102.

In some examples, the vehicle computing system may determine the potential object interaction(s) based on a determination that a distance (D) to an intersection between the predicted object trajectories 224 is within a threshold distance of one or more of the objects 206. In such examples, the vehicle computing system may determine that, absent a modification to one or more of the associated object trajectories 224, the objects 206 may collide. In various examples, the vehicle computing system may determine that the modification to the associated object trajectories 224 may affect the operation of the vehicle 102. For example, the first object 206(1) may accelerate to cross through the junction 222 before the third object 206(3) crosses a road associated therewith, while traveling on the second object trajectory 224(2). An acceleration of the first object 206(1) may directly impact the vehicle 102 traveling through the environment 200, such as to yield to the first object 206(1), accelerate to cross through the junction 222 ahead of the first object 206(1), or the like.

In various examples, the threshold distance may be determined based on an object speed associated with one or more of the objects trajectories 224 of the potential object interaction. In such examples, the threshold distance may increase as the object speed increases. In some examples, the threshold distance may be determined based on a type of object 206, such as that described above.

As discussed above, the vehicle computing system may modify one or more dimensions of the relevance polygon 204 based on a potential object interaction and/or other factors, such a detection of an occluded object, a type of occluded object, map data associated with the environment, and the like. The vehicle computing system may utilize the relevance polygon 204 (initial relevance polygon 204(1) and modified relevance polygon 204(2)) to identify one or more relevant objects 206 in the environment 200.

In various examples, the vehicle computing system determine that objects 106 located within the boundary 212 of the relevance polygon 204 are relevant to the vehicle 202 and will be included in control planning considerations. In some examples, the relevance determination associated with the relevance polygon 204 may override an initial determination of irrelevance with respect to the objects 206, such as initial irrelevance determination 128.

As discussed above, the vehicle computing system may determine an initial relevance determination utilizing techniques described in U.S. patent application Ser. Nos. 16/135, 038, 16/389,720, 16/417,260, and 17/086,047, the entire contents of which are incorporated herein by reference above in their entirety. Based on the relevance determination of an object 206, the vehicle computing system may include object data associated with the object 206 in vehicle planning considerations.

In some examples, the initial relevance determination may result in an initial irrelevance determination. In such examples, the vehicle computing system may represent an initial determination that an object 206 is irrelevant to the vehicle 202. For example, the third object 206(3) is a pedestrian walking away from the vehicle 202 (second object trajectory 224(2) is directed away from the vehicle 202 and/or planned path 214 thereof). Based at least in part on the second object trajectory 224(2) indicating that the object 206(3) is traveling away from the planned path 214 of the vehicle, the vehicle computing system may render an initial irrelevance determination.

Responsive to the initial irrelevance determination, the vehicle computing system may determine a final relevance determination based on the relevance polygon 204. The final relevance determination may be based at least in part on the object location 220 associated with the object 206 relative to the relevance polygon 204. In various examples, the vehicle computing system may determine whether the object location 220 is associated with the relevance polygon 204. The object location 220 may be associated with the relevance polygon 204 based on a determination that the object location 220 is located at or within a boundary 212 defining the relevance polygon 204.

In some examples, based on a determination that the object location 220 is not associated with the relevance polygon 204, the vehicle computing system may generate a final irrelevance determination, such as final irrelevance determination 130(1) of FIG. 1. In such examples, the vehicle computing system may withhold data associated with the irrelevant object 206 from vehicle planning considerations.

In some examples, based on a determination that the object location 220 is associated with the relevance polygon 204 (e.g., within the boundary 212), the vehicle computing system may determine that the object 206 is relevant to the vehicle 202, such as in a relevance determination. In some examples, the relevance determination, such as relevance determination 126, may include a final relevance determination. Based at least in part on the final relevance determination, the vehicle computing system may include data associated with the relevant object 206 in control planning considerations (e.g., control the vehicle 202 based on inclusion of data associated with the relevant object 206). Continuing the example from above of the third object 206(3) (pedestrian) walking away from the vehicle 202 on the second object trajectory 224(2), the vehicle computing system may determine an initial irrelevance determination. Based on determination that the third object location 220(3) is associated with the relevance polygon 204, the vehicle computing system may determine that the third object 206(3) is relevant to the vehicle 202. Based on the determination of relevance, the vehicle computing system may include data associated with the third object 206(3) in vehicle control planning considerations.

Additionally, or in the alternative, the vehicle computing system may determine to modify a dimension (e.g., a lateral, longitudinal and/or vertical extent) of the relevance polygon 204 based on a maneuver, such as turning left, right, driving through an intersection, changing lanes, or the like. In some examples, the modification to the relevance polygon may be determined based at least in part on the maneuver. For example, the vehicle computing system may determine that the vehicle is approaching junction 222 and may extend a left lateral extent of the relevance polygon 204 as illustrated in FIG. 2, such as to track and process data associated with the objects 206 approaching the junction 222.

Figure 3:
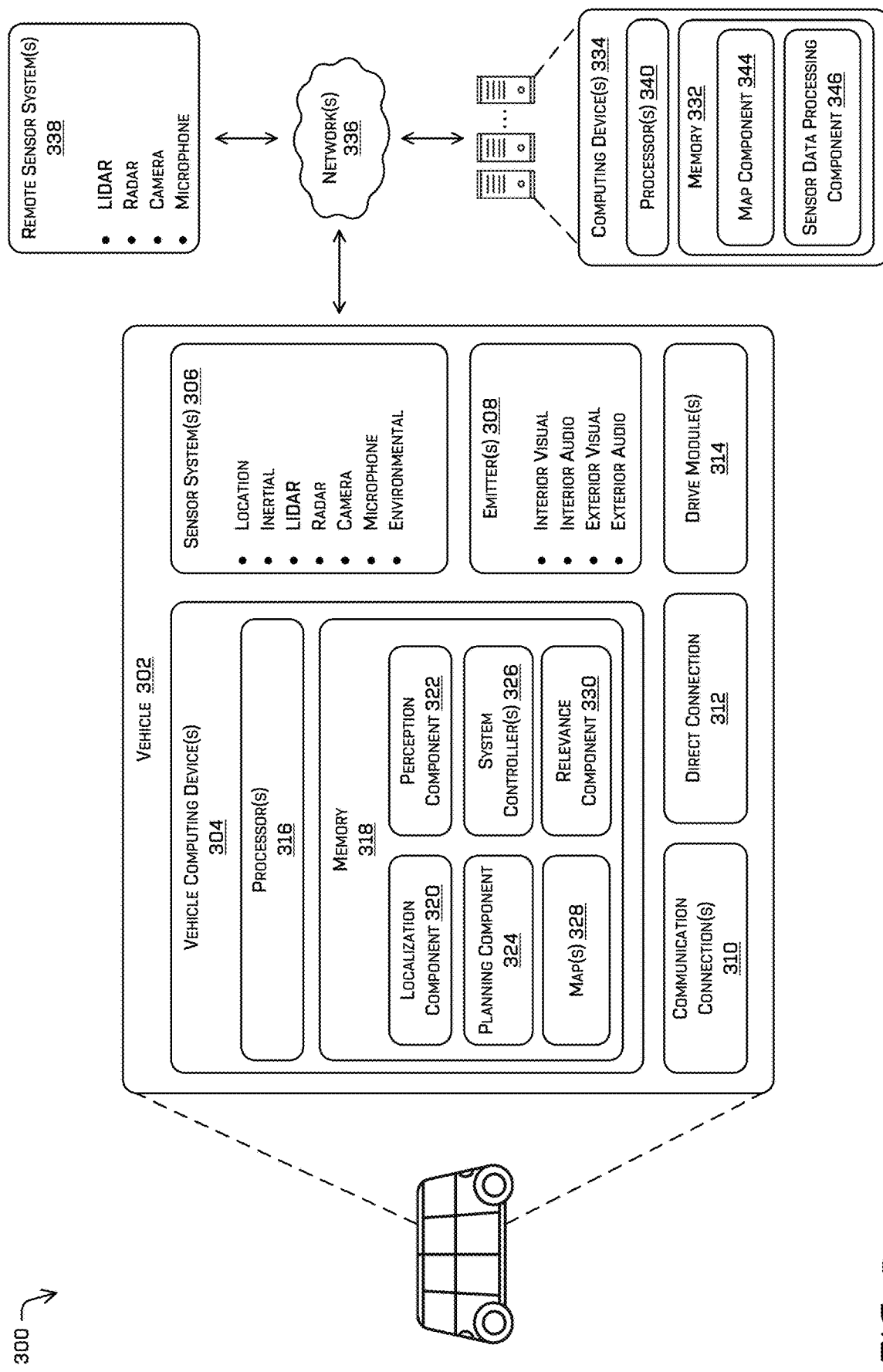
FIG. 3 is a block diagram of an example system for implementing the techniques described herein.

FIG. 3 is a block diagram of an example system 300 for implementing the techniques described herein. In at least one example, the system 300 may include a vehicle 302, such as vehicle 102 and/or vehicle 202.

The vehicle 302 may include a vehicle computing device 304, one or more sensor systems 306, such as sensor(s) 208, one or more emitters 308, one or more communication connections 310, at least one direct connection 312, and one or more drive modules 314.

The vehicle computing device 304 may include one or more processors 316 and memory 318 communicatively coupled with the one or more processors 316. In the illustrated example, the vehicle 302 is an autonomous vehicle; however, the vehicle 302 could be any other type of vehicle, such as a semi-autonomous vehicle, or any other system having at least an image capture device (e.g., a camera enabled smartphone). In the illustrated example, the memory 318 of the vehicle computing device 304 stores a localization component 320, a perception component 322, a planning component 324, one or more system controllers 326, one or more maps 328, and a relevance component 330. Though depicted in FIG. 3 as residing in the memory 318 for illustrative purposes, it is contemplated that the localization component 320, a perception component 322, a planning component 324, one or more system controllers 326, one or more maps 328, and a relevance component 330 may additionally, or alternatively, be accessible to the vehicle 302 (e.g., stored on, or otherwise accessible by, memory remote from the vehicle 302, such as, for example, on memory 332 of a remote computing device 334).

In at least one example, the localization component 320 may include functionality to receive data from the sensor system(s) 306 to determine a position and/or orientation of the vehicle 302 (e.g., one or more of an x-, y-, z-position, roll, pitch, or yaw). For example, the localization component 320 may include and/or request/receive a map of an environment and may continuously determine a location and/or orientation of the autonomous vehicle within the map. In some instances, the localization component 320 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 320 may provide data to various components of the vehicle 302 to determine an initial position of an autonomous vehicle for generating a path polygon associated with the vehicle path, as discussed herein.

In some instances, the perception component 322 may include functionality to perform object detection, segmentation, and/or classification. In some examples, the perception component 322 may provide processed sensor data that indicates a presence of an object (e.g., entity) that is proximate to the vehicle 302 and/or a classification of the object as an object type (e.g., car, pedestrian, cyclist, animal, building, tree, road surface, curb, sidewalk, unknown, etc.). In some examples, the perception component 322 may provide processed sensor data that indicates a presence of a stationary entity that is proximate to the vehicle 302 and/or a classification of the stationary entity as a type (e.g., building, tree, road surface, curb, sidewalk, unknown, etc.).

In various examples, the perception component 322 may include functionality to detect one or more occluded objects, such as utilizing the techniques described in U.S. patent application Ser. Nos. 16/011,436, and 16/246,208, the entire contents of both applications are incorporated herein by reference above. In various examples, the perception component 322 may include functionality to detect the occluded object(s) utilizing ray tracing techniques, such as those described above, in association with a top-down representation of the environment of the vehicle 302.

In additional or alternative examples, the perception component 322 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planning component 324 may determine a path for the vehicle 302 to follow to traverse through an environment. For example, the planning component 324 may determine various routes and trajectories and various levels of detail. For example, the planning component 324 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 324 may generate an instruction for guiding the autonomous vehicle 302 along at least a portion of the route from the first location to the second location. In at least one example, the planning component 324 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 302 to navigate.

In some examples, the planning component 324 may include a prediction component to generate predicted trajectories of objects in an environment. For example, a prediction component may generate one or more predicted trajectories for objects within a threshold distance from the vehicle 302. In some examples, a prediction component may measure a trace of an object and generate a trajectory for the object based on observed and predicted behavior.

In at least one example, the vehicle computing device 304 may include one or more system controllers 326, which may be configured to control steering, propulsion, braking, safety, emitters, communication, and other systems of the vehicle 302. The system controller(s) 326 may communicate with and/or control corresponding systems of the drive module(s) 314 and/or other components of the vehicle 302.

The memory 318 may further include one or more maps 328 that may be used by the vehicle 302 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 302 may be controlled based at least in part on the maps 328. That is, the maps 328 may be used in connection with the localization component 320, the perception component 322, and/or the planning component 324 to determine a location of the vehicle 302, detect objects in an environment, and/or generate routes and/or trajectories to navigate within an environment. Additionally, as described above, the maps 328 may be used in connection with the relevance component 330 to determine to modify one or more dimensions of a relevance polygon.

In some examples, the one or more maps 328 may be stored on a remote computing device(s) (such as the computing device(s) 334) accessible via network(s) 336. In some examples, multiple maps 328 may be stored based on, for example, a characteristic (e.g., type of entity, time of day, day of week, season of the year, etc.). Storing multiple maps 328 may have similar memory requirements, but increase the speed at which data in a map may be accessed.

As illustrated in FIG. 3, the vehicle computing device(s) 304 may include a relevance component 330. In various examples, the relevance component 330 may be configured to determine one or more dimensions associated with a relevance polygon, such as that described herein. In some examples, the dimensions of the relevance polygon may be determined based on an area and/or volume associated therewith. In some examples, the dimensions of the relevance polygon may be determined based on a speed of the vehicle, as described above. In various examples, the relevance polygon may include a minimum size (e.g., minimum width, length, height, area, volume, etc.) associated therewith. In some examples, the minimum size may be associated with a threshold speed of the vehicle. In such examples, at or below the threshold speed, the relevance component may generate the relevance polygon with the minimum size. At or above the threshold speed, the relevance component may generate the relevance polygon based on the speed, such as by multiplying one or more dimensions by a scaling factor based on the speed.

Additionally or in the alternative, the relevance component 330 may modify one or more dimensions of the relevance polygon based on map data, object trajectories, potential object interactions, and the like, such as that described above with regard to FIGS. 1 and 2.

In various examples, the relevance component 330 may be configured to determine a relevance (or irrelevance) of a detected object in the environment. In some examples, the relevance component 330 determines an initial relevance determination utilizing techniques described in U.S. patent application Ser. Nos. 16/135,038, 16/389,720, 16/417,260, and 17/086,047, the entire contents of which are incorporated herein by reference above in their entirety. In various examples, the relevance component 330 may be configured to determine whether an object location associated with a detected object is located within a boundary of the relevance polygon. Based on a determination that an object location is at or within the boundary, the relevance component 330 determines that the associated object is relevant to the vehicle, regardless of an initial determination of irrelevance, as described above. Responsive to a determination that the object is relevant to the vehicle 302, the relevance component 330 may cause data associated therewith to be provided to the planning component 324, such as to incorporate in vehicle control planning considerations. Based on a determination that an object location is outside the boundary, the relevance component 330 determines that the associated object is irrelevant to the vehicle. Responsive to a determination that the object is irrelevant to the vehicle 302, the relevance component 330 may withhold data (or otherwise limit, disregard, discard, etc. such data) associated therewith from the planning component 324. As such, the relevance component 330 may cause the vehicle 302 to be controlled based on exclusion of data associated with the object.

As can be understood, the components discussed herein (e.g., the localization component 320, the perception component 322, the planning component 324, the one or more system controllers 326, the one or more maps 328, the relevance component 330 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 318 (and the memory 332, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 306 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 306 may include multiple instances of each of these or other types of sensors. For instance, the lidar sensors may include individual lidar sensors located at the corners, front, back, sides, and/or top of the vehicle 302. As another example, the camera sensors may include multiple cameras disposed at various locations about the exterior and/or interior of the vehicle 302. The sensor system(s) 306 may provide input to the vehicle computing device 304. Additionally or alternatively, the sensor system(s) 306 may send sensor data, via the one or more networks 336, to the one or more computing device(s) 334 at a particular frequency, after a lapse of a predetermined period of time, in near real-time, etc.

The vehicle 302 may also include one or more emitters 308 for emitting light and/or sound, as described above. The emitters 308 in this example include interior audio and visual emitters to communicate with passengers of the vehicle 302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 302 may also include one or more communication connection(s) 310 that enable communication between the vehicle 302 and one or more other local or remote computing device(s). For instance, the communication connection(s) 310 may facilitate communication with other local computing device(s) on the vehicle 302 and/or the drive module(s) 314. Also, the communication connection(s) 310 may allow the vehicle to communicate with other nearby computing device(s) (e.g., computing device(s) 334, other nearby vehicles, etc.) and/or one or more remote sensor system(s) 338 for receiving sensor data.

The communications connection(s) 310 may include physical and/or logical interfaces for connecting the vehicle computing device 304 to another computing device or a network, such as network(s) 336. For example, the communications connection(s) 310 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 may include one or more drive modules 314. In some examples, the vehicle 302 may have a single drive module 314. In at least one example, if the vehicle 302 has multiple drive modules 314, individual drive modules 314 may be positioned on opposite ends of the vehicle 302 (e.g., the front and the rear, etc.). In at least one example, the drive module(s) 314 may include one or more sensor systems to detect conditions of the drive module(s) 314 and/or the surroundings of the vehicle 302. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive module(s) 314. In some cases, the sensor system(s) on the drive module(s) 314 may overlap or supplement corresponding systems of the vehicle 302 (e.g., sensor system(s) 306).

The drive module(s) 314 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 314. Furthermore, the drive module(s) 314 may also include one or more communication connection(s) that enable communication by the respective drive module with one or more other local or remote computing device(s).

In at least one example, the direct connection 312 may provide a physical interface to couple the one or more drive module(s) 314 with the body of the vehicle 302. For example, the direct connection 312 may allow the transfer of energy, fluids, air, data, etc. between the drive module(s) 314 and the vehicle. In some instances, the direct connection 312 may further releasably secure the drive module(s) 314 to the body of the vehicle 302.

In at least one example, the localization component 320, the perception component 322, the planning component 324, the one or more system controllers 326, the one or more maps 328, and the relevance component 330 and/or various components thereof, may process sensor data, as described above, and may send their respective outputs, over the one or more network(s) 336, to the computing device(s) 334. In at least one example, the localization component 320, the perception component 322, the planning component 324, the one or more system controllers 326, the one or more maps 328, and the relevance component 330 may send their respective outputs to the computing device(s) 334 at a particular frequency, after a lapse of a predetermined period of time, in near real-time, etc.

In some examples, the vehicle 302 may send sensor data to the computing device(s) 334 via the network(s) 336. In some examples, the vehicle 302 may receive sensor data from the computing device(s) 334 via the network(s) 336. The sensor data may include raw sensor data and/or processed sensor data and/or representations of sensor data. In some examples, the sensor data (raw or processed) may be sent and/or received as one or more log files.

The computing device(s) 334 may include processor(s) 340 and a memory 332 storing a map component 344 and a sensor data processing component 346. In some examples, the map component 344 may include functionality to generate maps of various resolutions. In such examples, the map component 344 may send one or more maps to the vehicle computing device 304 for navigational purposes. In various examples, the sensor data processing component 346 may be configured to receive data from one or more remote sensors, such as sensor systems 306 and/or remote sensor system(s) 338. In some examples, the sensor data processing component 346 may be configured to process the data and send processed sensor data to the vehicle computing device(s) 304, such as for use by the relevance component 330, the perception component 322, and/or the planning component 324. In some examples, the sensor data processing component 346 may be configured to send raw sensor data to the vehicle computing device(s) 304.

The processor(s) 316 of the vehicle 302 and the processor(s) 340 of the computing device(s) 334 may be any suitable processor capable of executing instructions to process data and perform operations as described herein. By way of example and not limitation, the processor(s) 316 and 340 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 318 and 332 are examples of non-transitory computer-readable media. The memory 318 and 332 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 318 and 332 may include at least a working memory and a storage memory. For example, the working memory may be a high-speed memory of limited capacity (e.g., cache memory) that is used for storing data to be operated on by the processor(s) 316 and 340. In some instances, the memory 318 and 332 may include a storage memory that may be a lower-speed memory of relatively large capacity that is used for long-term storage of data. In some cases, the processor(s) 316 and 340 cannot operate directly on data that is stored in the storage memory, and data may need to be loaded into a working memory for performing operations based on the data, as discussed herein.

It should be noted that while FIG. 3 is illustrated as a distributed system, in alternative examples, components of the vehicle 302 may be associated with the computing device(s) 334 and/or components of the computing device(s) 334 may be associated with the vehicle 302. That is, the vehicle 302 may perform one or more of the functions associated with the computing device(s) 334, and vice versa.

FIGS. 4-7 illustrate example processes in accordance with examples of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 4:
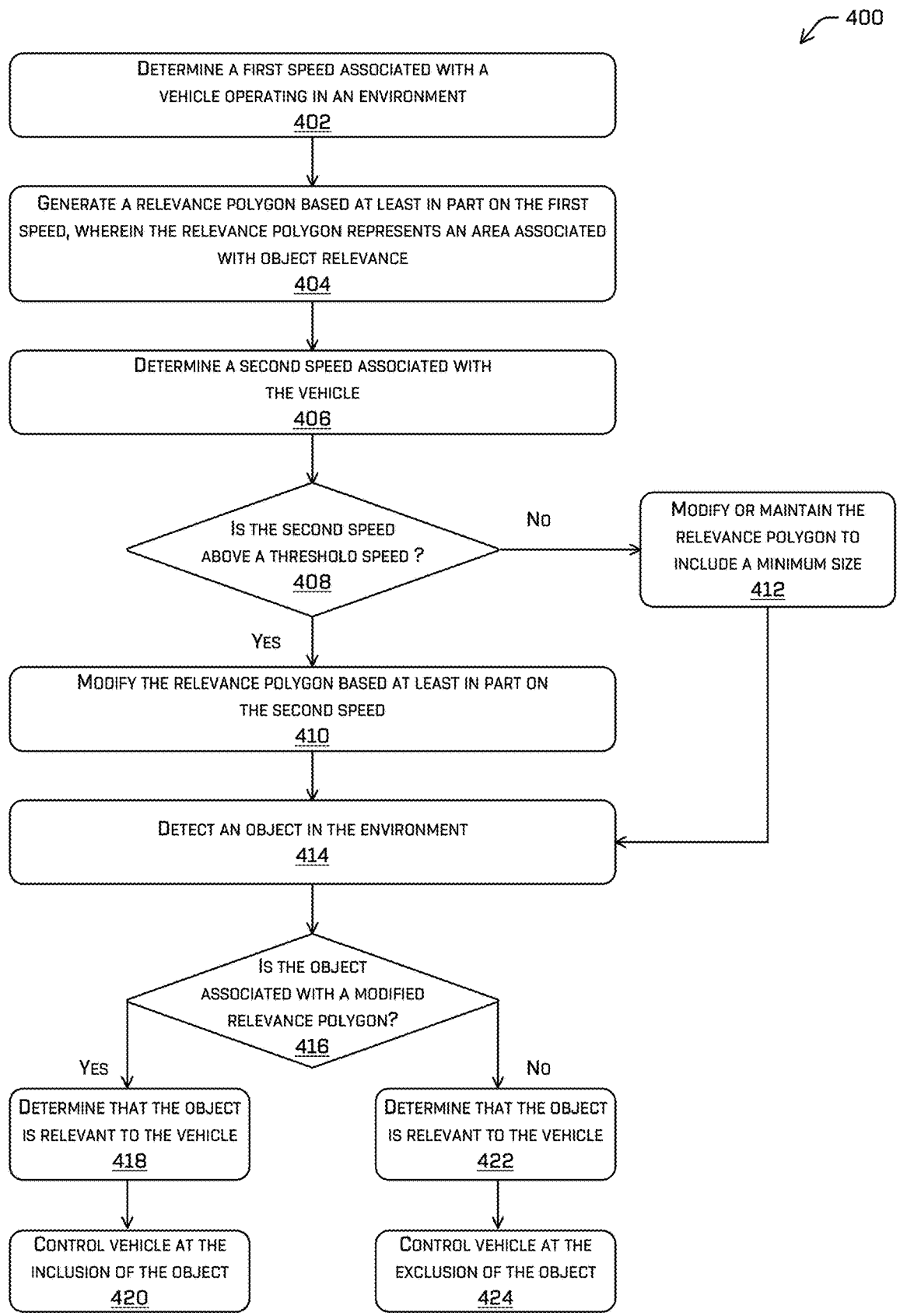
FIG. 4 depicts an example process for modifying a relevance polygon based on a speed of a vehicle, in accordance with examples of the disclosure.

FIG. 4 depicts an example process 400 for modifying a relevance polygon based on a speed of a vehicle, in accordance with examples of the disclosure. For example, some or all of the process 400 may be performed by one or more components in FIG. 3, as described herein. For example, some or all of the process 400 may be performed by the vehicle computing device(s) 304.

At operation 402, the process 400 includes determining a first speed associated with a vehicle operating in an environment. The first speed may correspond to a vehicle trajectory associated with a planned path of the vehicle through the environment.

At operation 404, the process 400 includes generating a relevance polygon based at least in part on the first speed, wherein the relevance polygon represents an area associated with object relevance. In various examples, the relevance polygon may include dimensions (e.g., width, length, and/or height, lateral extents, longitudinal extents, vertical extent, etc.) based on the first speed. In some examples, the relevance polygon may include a minimum area and/or volume based on the first speed. In some examples, the first speed may include a speed at or below a threshold speed (e.g., 7 mph, 11 kph, etc.) associated with a minimum size and/or minimum dimensions (width, length, height) of the relevance polygon. In such examples, the relevance polygon may include the minimum size and/or minimum dimensions.

At operation 406, the process 400 includes determining a second speed associated with the vehicle operating in the environment. The second speed may include a speed above or below the first speed.

At operation 408, the process 400 includes determining whether the second speed is above the threshold speed. As described above, the threshold speed may be associated with a minimum size of the relevance polygon.

Based on a determination that the second speed is at or above the threshold speed ("Yes" at operation 408), the process 400 at operation 410, includes modifying the relevance polygon based at least in part on the second speed. A modification to the relevance polygon may include a modification to one or more of the dimension(s) of the relevance polygon. In at least one example, the modification may include a modification to the lateral extents (left and right extents) and at least one longitudinal extent (e.g., extent ahead of the vehicle, extent behind the vehicle). As a non-limiting example, such extents may be scaled (e.g., linearly, non-linearly, or otherwise) proportionally with the speed, though any other function with respect to the speed is contemplated. Further, as above, such modifications may be limited, altered, or otherwise take into account secondary data (such as map data, object type, etc.).

In various examples, the second speed may include a speed that is greater than the first speed. In such examples, a modified relevance polygon includes an area and/or volume that is greater than an initial relevance polygon associated with the first speed. In some examples, the second speed may include a speed that is less than the first speed. In such examples, the modified relevance polygon includes an area and/or volume that is less than an initial relevance polygon associated with the first speed.

Based on a determination that the second speed is at or below the threshold speed ("No" at operation 408), the process 400 at operation 412, includes modifying or maintaining the relevance polygon to include the minimum size. In various examples, the minimum size may have associated therewith minimum dimensions. In such examples, the vehicle computing system may modify the relevance polygon to include the minimum dimensions.

At operation 414, the process 400 includes detecting an object in the environment. As discussed above, the vehicle computing system may detect the object based on sensor data captured by one or more sensors of the vehicle and/or one or more remote sensors in the environment.

At operation 416, the process 400 includes determining whether the object is associated with a modified relevance polygon. The vehicle computing system may determine that the object is associated with the modified relevance polygon based on a determination that an object location associated with the object is at or within a boundary of the modified relevance polygon. The boundary may represent a perimeter of the modified relevance polygon.

Based on a determination that the object is associated with the modified relevance polygon ("Yes" at operation 416), the process 400, at operation 418, includes determining that the object is relevant to the vehicle. An object may be relevant to the vehicle based on a determination that the operation of the object may impact an operation of the vehicle in the environment. In some examples, the object may be relevant based on a determination that the object will impact the operation of the vehicle within a threshold amount of time from a current time associated with the vehicle operation.

At operation 420, the process 400 includes controlling the vehicle based on inclusion of data associated with the object. In various examples, the vehicle computing system may control the vehicle based on inclusion of the object by including the object data associated with the object in vehicle control planning considerations.

Based on a determination that the object is not associated with the modified relevance polygon ("No" at operation 416), the process 400, at operation 422, includes determining that the object is irrelevant to the vehicle. An object may be irrelevant to the vehicle based on a determination that the operation of the object may not impact an operation of the vehicle in the environment. In some examples, the object may be irrelevant based on a determination that the object will not impact the operation of the vehicle within the threshold amount of time in future operations of the vehicle in the environment.

At operation 424, the process 400 includes controlling the vehicle based on exclusion of data associated with the object. In various examples, the vehicle computing system may control the vehicle based on exclusion of data associated with the object by omitting the object data associated with the object from vehicle control planning considerations.

Figure 5:
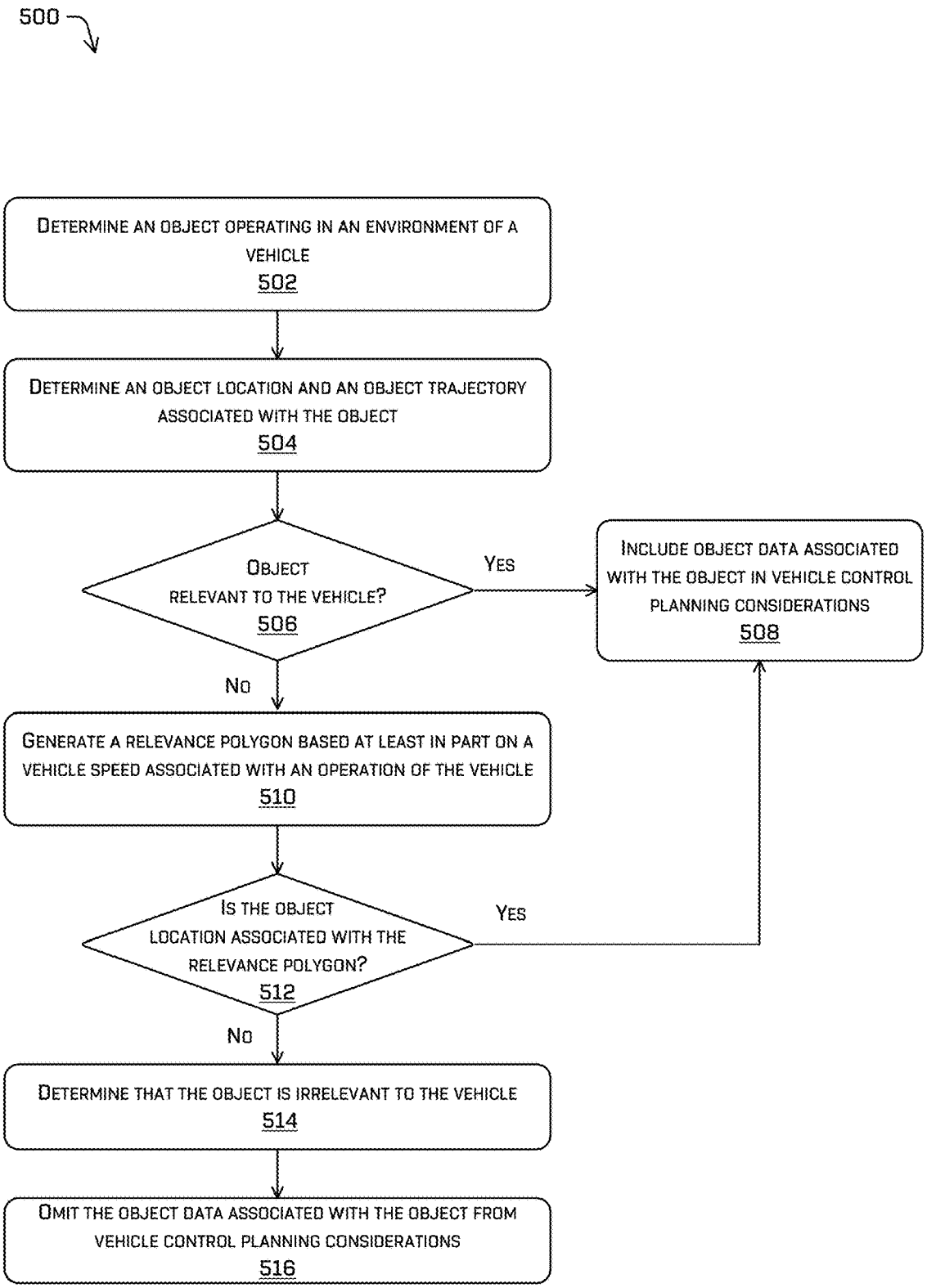
FIG. 5 depicts an example process for determining relevance of an object to a vehicle based on a relevance polygon associated with the vehicle, in accordance with examples of the disclosure.

FIG. 5 depicts an example process 500 for determining an action to perform to avoid a collision between a vehicle and an object in an environment, in accordance with examples of the disclosure. For example, some or all of the process 500 may be performed by one or more components in FIG. 3, as described herein. For example, some or all of the process 500 may be performed by the vehicle computing device(s) 304.

At operation 502, the process 500 includes determining an object operating in an environment of a vehicle. In various examples, a vehicle computing system may determine the object based on sensor data captured by one or more sensors associated with the vehicle and/or one or more remote sensors.

At operation 504, the process 500 includes determining an object location and an object trajectory associated with the object. The object location may be determined based on the sensor data. In various examples, the object trajectory may include a predicted object trajectory generated utilizing a top down representation of the environment, heat maps, tree search methods, and/or temporal logic formulas, as described above. The predicted object trajectory may represent a predicted path of the object through the environment.

At operation 506, the process 500 includes determining whether the object is relevant to the vehicle. In various examples, the vehicle computing system may determine that the object is relevant to the vehicle based on the object location and/or the object trajectory, such as utilizing one or more of the techniques described in U.S. patent application Ser. Nos. 16/135,038, 16/389,720, 16/417,260, and 17/086,047, the entire contents of which are incorporated herein by reference above in their entirety. As discussed above, a determination of relevance based on the object location and/or the object trajectory may include an initial relevance determination.

Based on a determination that the object is relevant to the vehicle ("Yes" at operation 506), the process 500, at operation 508, includes including object data associated with the object in vehicle control planning considerations. In various examples, including the object data may include the vehicle computing system controlling the vehicle based on inclusion of data associated with the object.

Based on a determination that the object is irrelevant to the vehicle ("No" at operation 506), the process 500, at operation 510, the process includes generating a relevance polygon based at least in part on a vehicle speed. In various examples, based on a determination that the vehicle speed is at or below a threshold speed, the relevance polygon may include a minimum size (e.g., minimum volume, minimum area, minimum dimensions, etc.). In various examples, based on a determination that the vehicle speed is at or above the threshold speed, the dimensions (e.g., width, length, height, lateral extent, longitudinal extent ahead of vehicle, longitudinal extent behind the vehicle, vertical extent, etc.) may be based on the speed. In some examples, the dimensions may be determined based on the speed multiplied by a scaling factor.

At operation 512, the process 500 includes determining whether the object location is associated with the relevance polygon. The vehicle computing system determines that the object location is associated with the relevance polygon based on a determination that the object location is at or within a boundary of the relevance polygon. The boundary may define an outer perimeter of the relevance polygon.

Based on a determination that the object location is associated with the relevance polygon ("Yes" at operation 512), the process 500 includes including the object data associated with the object in vehicle control planning considerations, such as that described above with regard to operation 508.

Based on a determination that the object location is not associated with the relevance polygon ("No" at operation 512), the process 500, at operation 514, includes determining that the object is irrelevant to the vehicle. An object may be irrelevant to the vehicle based on a determination that the operation of the object may not impact an operation of the vehicle in the environment. In some examples, the object may be irrelevant based on a determination that the object will not impact the operation of the vehicle for a threshold amount of time in future operations of the vehicle in the environment.

At operation 516, the process 500 includes omitting the object data associated with the object from vehicle control planning considerations (e.g., disregarding, discarding, ignoring, or otherwise not relying on the data associated with the object). An omission of object data associated with the object results in the vehicle computing system controlling the vehicle based on exclusion of data associated with the object.

Figure 6:
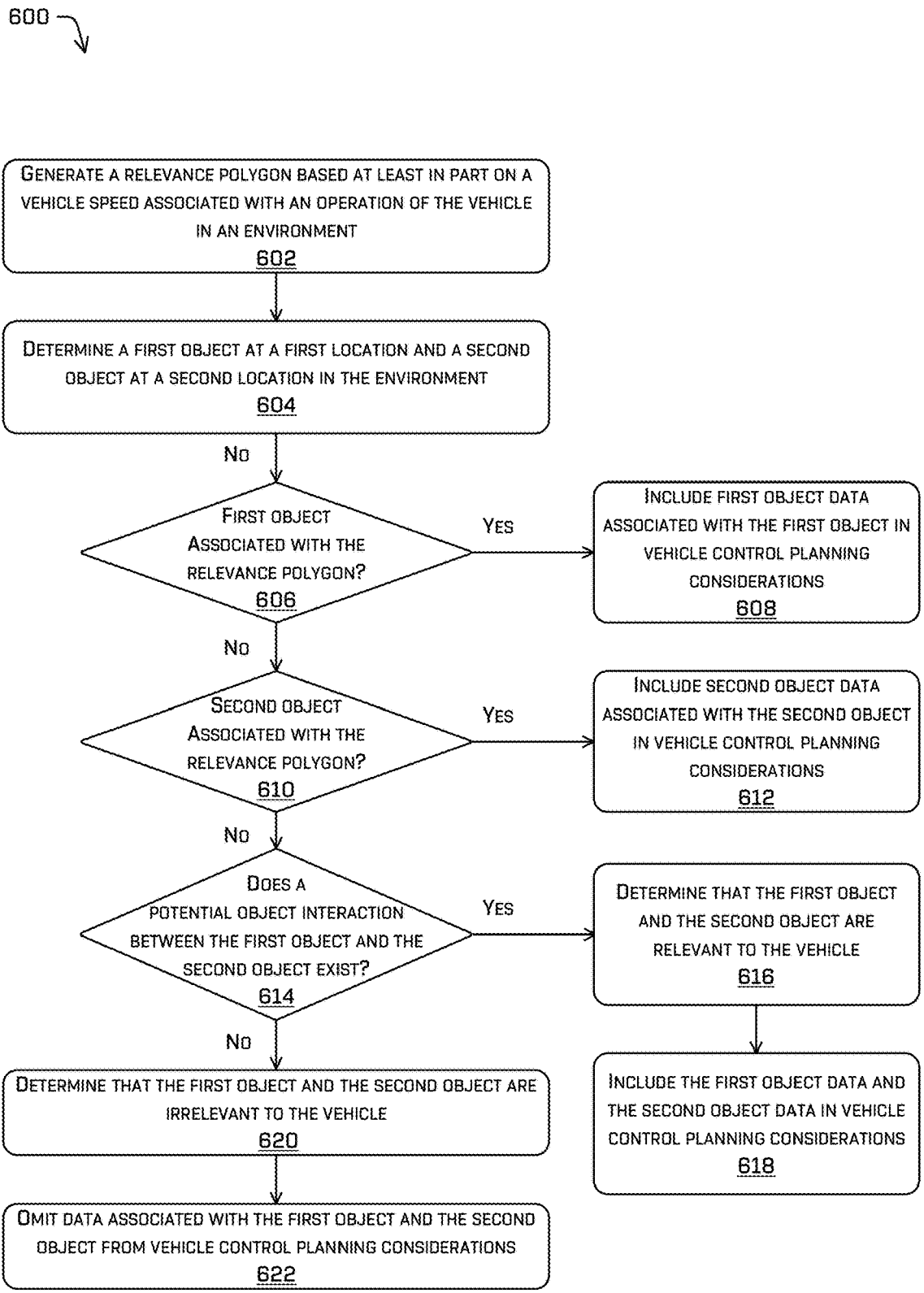
FIG. 6 depicts an example process for determining relevance of objects to a vehicle based on a potential object interaction between the objects, in accordance with examples of the disclosure.

FIG. 6 depicts an example process 600 for determining relevance of objects to a vehicle based on a potential object interaction between the objects, in accordance with examples of the disclosure. For example, some or all of the process 600 may be performed by one or more components in FIG. 3, as described herein. For example, some or all of the process 600 may be performed by the vehicle computing device(s) 304.

At operation 602, the process 600 includes generating a relevance polygon based at least in part on a vehicle speed. In various examples, based on a determination that the vehicle speed is at or below a threshold speed, the relevance polygon may include a minimum size (e.g., minimum volume, minimum area, minimum dimensions, etc.). In various examples, based on a determination that the vehicle speed is at or above the threshold speed, the dimensions (e.g., width, length, height, lateral extent, longitudinal extent ahead of vehicle, longitudinal extent behind the vehicle, vertical extent, etc.) may be based on the speed. In some examples, the dimensions may be determined based on the speed multiplied by a scaling factor.

At operation 604, the process 600 includes determining a first object at a first location and a second object at a second location. In some examples, the vehicle computing system may determine the first object and the second object utilizing sensor data, such as described above.

At operation 606, the process 600 includes determining whether the first object is associated with the relevance polygon. The vehicle computing system determines that the first location is associated with the relevance polygon based on a determination that the first location is at or within a boundary of the relevance polygon. The boundary may define an outer perimeter of the relevance polygon.

Based on a determination that the first location is associated with the relevance polygon ("Yes" at operation 606), the process 600 includes, at operation 608, including first object data associated with the first object in vehicle control planning considerations.

Based on a determination that the first location is not associated with the relevance polygon ("No" at operation 606), the process 600 includes, at operation 610, includes determining whether the second object is associated with the relevance polygon.

Based on a determination that the second location is associated with the relevance polygon ("Yes" at operation 610), the process 600 includes, at operation 612, including second object data associated with the second object in vehicle control planning considerations.

Based on a determination that the second location is not associated with the relevance polygon ("No" at operation 610), the process 600 includes, at operation 614, includes determining whether a potential object interaction between the first object and the second object exists. In some examples, the potential object interaction may be determined based on determining that a first object trajectory associated with the first object and a second object trajectory associated with the second object intersect. In some examples, the potential object interaction may be based on a determination that the first object trajectory and the second object trajectory are substantially perpendicular to one another. In some examples, the determination of the potential object interaction may be based on the first object trajectory and a second object trajectory intersecting within a threshold distance of the first location or the second location. As discussed above, the threshold distance may be determined based on an object type associated with the first object and/or the second object, a speed associated with the first object trajectory and/or the second object trajectory, and/or other factors associated with the operation of the first object and/or the second object in the environment.

Based on a determination that the potential object interaction exists between the first object and the second object ("Yes" at operation 614), the process 600, at operation 616 includes determining that the first object and the second object are relevant to the vehicle. In various examples, the vehicle computing system may determine that the first object and the second object are relevant based on a determination that an operation of the first object and the second object may impact an operation of the vehicle. In various examples, the vehicle computing system may determine that the first object and the second object are relevant based on an object interaction function associated with the vehicle computing system. IN such examples, the vehicle computing system may process data associated with each object that may interact with another object, such as to determine whether the objects may impact the operation of the vehicle, to train a machine learned data model to determine object interactions, or the like.

At operation 618, the process 600 includes including the first object data and the second object data in vehicle control planning considerations. In various examples, the vehicle computing system may control the vehicle based on inclusion of data associated with the first object and the second object based on the first object data and the second object data.

Based on a determination that the potential object interaction does not exist between the first object and the second object ("No" at operation 614), the process 600, at operation 620 includes determining that the first object and the second object are irrelevant to the vehicle. The objects may be irrelevant to the vehicle based on a determination that the operation of either object will not impact an operation of the vehicle in the environment. In some examples, the objects may be determined to be irrelevant based on a determination that the objects will not impact the operation of the vehicle for a threshold amount of time in future operations of the vehicle in the environment.

At operation 622, the process 600 includes omitting the data associated with the first object and the second object from vehicle control planning considerations. An omission of the data associated with the first object and the second object results in the vehicle computing system controlling the vehicle based on exclusion of data associated with the object.

Figure 7:
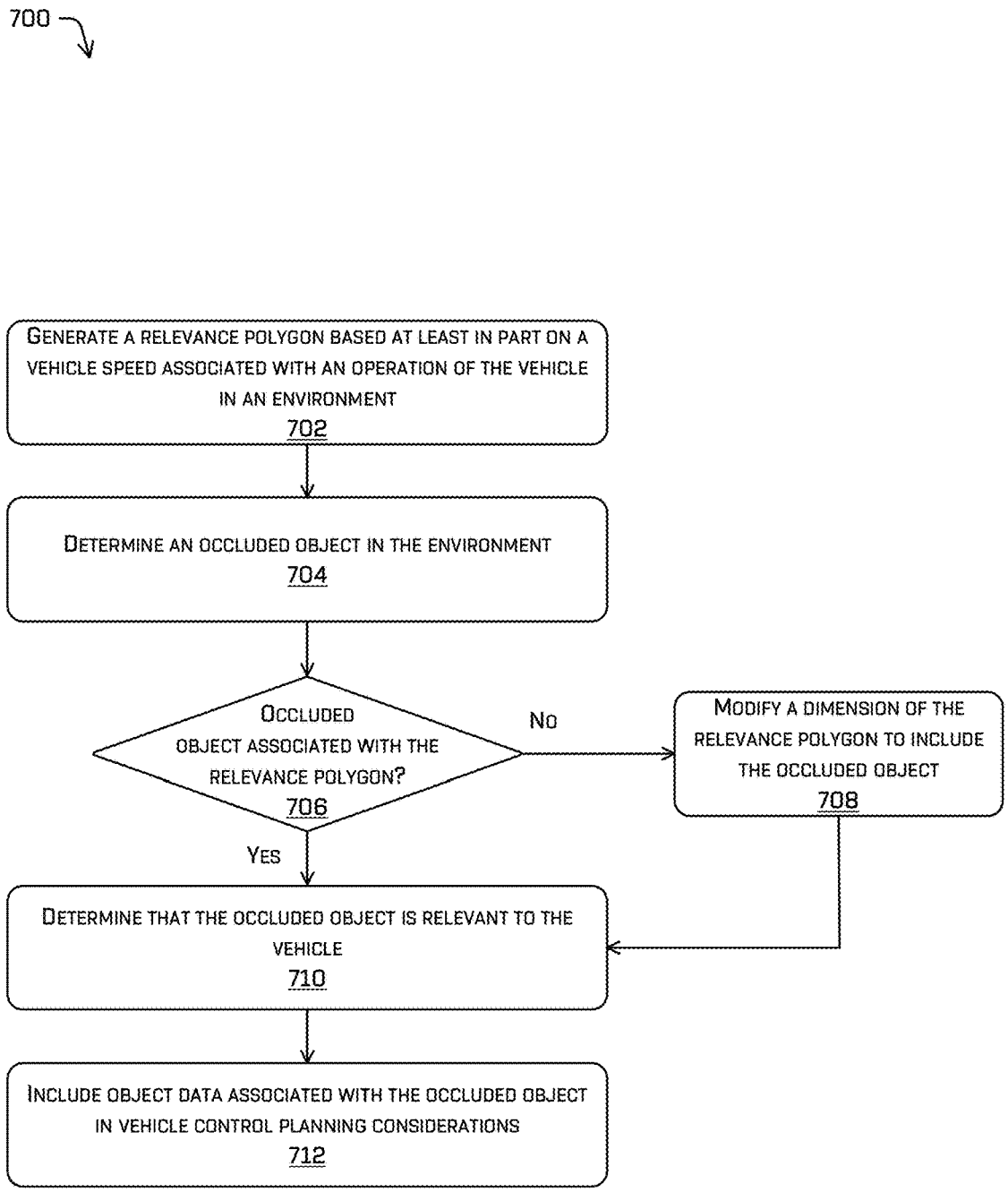
FIG. 7 depicts an example process for modifying a relevance polygon based on a detection of an occluded object, in accordance with examples of the disclosure.

FIG. 7 depicts an example process 700 for modifying a relevance polygon based on a detection of an occluded object, in accordance with examples of the disclosure. For example, some or all of the process 700 may be performed by one or more components in FIG. 3, as described herein. For example, some or all of the process 700 may be performed by the vehicle computing device(s) 304.

At operation 702, the process 700 includes generating a relevance polygon based at least in part on a vehicle speed. In various examples, based on a determination that the vehicle speed is at or below a threshold speed, the relevance polygon may include a minimum size (e.g., minimum volume, minimum area, minimum dimensions, etc.). In various examples, based on a determination that the vehicle speed is at or above the threshold speed, the dimensions (e.g., width, length, height, lateral extent, longitudinal extent ahead of vehicle, longitudinal extent behind the vehicle, vertical extent, etc.) may be based on the speed. In some examples, the dimensions may be determined based on the speed multiplied by a scaling factor.

At operation 704, the process 700 includes determining a likelihood of an occluded object in the environment. In various examples, a vehicle computing system may determine the occluded object based on sensor data captured by one or more sensors of the vehicle or one or more remote sensors. As discussed above the vehicle computing system may determine the likelihood of the occluded object utilizing ray tracing techniques applied to a top-down representation of the environment. In some examples, the vehicle computing system may determine the occluded object utilizing techniques described U.S. patent application Ser. Nos. 16/011,436, and 16/246,208, the entire contents of both applications are incorporated herein by reference above.

At operation 706, the process 700 includes determining whether the occluded object is associated with the relevance polygon. The vehicle computing system may determine that the occluded object is associated with the relevance polygon based on a determination that a location associated therewith is at or within a boundary of the relevance polygon. The boundary may define an outer perimeter of the relevance polygon.

Based on a determination that the occluded object is not associated with the relevance polygon ("No" at operation 706), the process 700 includes, at operation 708, modifying the relevance polygon to include the occluded object. In various examples, modifying the relevance polygon includes modifying one or more dimensions of the relevance polygon to include the location associated with the occluded object.

Based on a determination that the occluded object is associated with the relevance polygon ("Yes" at operation 706), the process 700 includes, at operation 710, determining that the occluded object is relevant to the vehicle. An object may be relevant to the vehicle based on a determination that the operation of the object may impact an operation of the vehicle in the environment. In various examples, based on the modification of the dimension of the relevance polygon to include the occluded object, the vehicle computing system may determine that the occluded object is associated with a modified relevance polygon and is therefore relevant to the vehicle.

At operation 712, the process 700 includes including object data associated with the occluded object in vehicle control planning considerations. In various examples, the vehicle computing system may control the vehicle based on inclusion of data associated with the occluded object based on the determination of relevance.

Example Clauses

A: A vehicle system comprising: one or more sensors; one or more processors; and memory storing processor-executable instructions that, when executed by the one or more processors, configure the vehicle to: receive sensor data from the one or more sensors; identify, at a first time, an object at a first location in an environment based at least in part on the sensor data; determine, at the first time, a first vehicle speed associated with the vehicle operating in the environment; generate, based at least in part on the first vehicle speed, a first relevance polygon associated with a planned path of the vehicle through the environment; determine that the first location of the object is outside a first boundary of the first relevance polygon; determine, based at least in part on determining that the first location of the object is outside the first boundary, that the object is irrelevant to the vehicle at the first time; and control the vehicle based on exclusion of data associated with the object at the first time based at least in part on determining that the object is irrelevant to the vehicle.

B: The vehicle system of paragraph A, wherein the processor-executable instructions further configure the vehicle to: determine a second vehicle speed associated with the vehicle operating in the environment at a second time after the first time; generate, based at least in part on the second vehicle speed, a second relevance polygon; determine a second location of the object at the second time; determine that the second location of the object is inside a second boundary of the second relevance polygon; determine that the object is relevant to the vehicle at the second time; and control the vehicle based on inclusion of data associated with the object at the second time.

C: The vehicle system of paragraph B, wherein: the first relevance polygon comprises at least two of: a first width, a first length or a first height; the second relevance polygon comprises at least two of: a second width, a second length or a second height; the second vehicle speed is greater than the first vehicle speed; and at least one of: the second width is greater than the first width; the second length is greater than the first length; or the second height is greater than the first height.

D: The vehicle system of any one of paragraphs A-C, wherein the object is a first object and the processor-executable instructions further configure the vehicle to: identify a second object at a second location in the environment based at least in part on the sensor data, wherein the second object is at least partially occluded by the first object; determine that the second object is outside of the first boundary associated with the first relevance polygon; modify the first relevance polygon to obtain a modified relevance polygon that includes the second location based at least in part on the second object being at least partially occluded by the first object; determine that the second object is relevant to the vehicle based at least in part on the second location being associated with the modified relevance polygon; and control the vehicle based on data associated with the second object E: The vehicle system of any one of paragraphs A-D, wherein the object is a first object and the processor-executable instructions further configure the vehicle to: identify a second object at a second location in the environment based at least in part on the sensor data; determine a first object trajectory associated with the first object and a second object trajectory associated with the second object;

determine that the first object trajectory intersects the second object trajectory within a threshold distance of the first location or the second location; modify the first relevance polygon to obtain a modified relevance polygon that includes the second location based at least in part on determining that the first object trajectory intersects the second object trajectory within the threshold distance; determining that the second object is relevant to the vehicle based at least in part on the second location being associated with the modified relevance polygon; and control the vehicle based on inclusion of data associated with the second object.

F: A method comprising: determining a speed associated with a vehicle operating in an environment; generating a relevance polygon associated with the vehicle based at least in part on the speed, wherein the relevance polygon is associated with a planned path of the vehicle through the environment; receiving sensor data from one or more sensors; identifying an object at a location in the environment based at least in part on the sensor data; and determining that the object is relevant to the vehicle based at least in part on the location of the object being associated with the relevance polygon.

G: The method of paragraph F, further comprising controlling the vehicle based on inclusion of data associated with the object.

H: The method of either paragraph F or paragraph G, wherein the speed is a first speed of the vehicle at a first time and the relevance polygon is a first relevance polygon, the method further comprising: determining a second speed associated with the vehicle at a second time; generating a second relevance polygon based at least in part on the second speed; determining that the location of the object is outside of a boundary associated with the second relevance polygon at the second time; determining that the object is irrelevant to the vehicle at the second time; and controlling the vehicle based on exclusion of data associated with the object.

I: The method of paragraph H, wherein the first relevance polygon defines a first area, the second relevance polygon defines a second area; the second speed is less than the first speed; and the second area is less than the first area J: The method any one of paragraphs F-I, wherein the object is a first object located at a first location, the method further comprising: identifying a second object at a second location in the environment based at least in part on the sensor data; determining that the second location is outside of a boundary associated with the relevance polygon; determining that the second object is irrelevant to the vehicle; and controlling the vehicle based on exclusion of data associated with the second object.

K: The method of any one of paragraphs F-J, further comprising: determining an object trajectory associated with the object traveling through the environment; and determining an initial determination of irrelevance based on the object trajectory, wherein determining that the object is relevant to the vehicle is based at least in part on determining that a relevance determination based on the relevance polygon overrides the initial determination of irrelevance L: The method of any one of paragraphs F-K, wherein the object is a first object located at a first location, the method further comprising: determining a second object at a second location in the environment based at least in part on the sensor data, wherein the second object is at least partially occluded by the first object; determining that the second object is outside of a boundary associated with the relevance polygon; and modifying the relevance polygon to obtain a modified relevance polygon that includes the second location based at least in part on the second object being at least partially occluded by the first object.

M: The method any one of paragraphs F-L, wherein: the relevance polygon is defined by a minimum size if the speed is less than or equal to a threshold speed; and a size of the relevance polygon scales with the speed if the speed is greater than or equal to the threshold speed.

N: The method of any one of paragraphs F-M, further comprising determining a maneuver to be performed by the vehicle; and receiving map data associated with the environment, wherein the relevance polygon is further based at least in part on one or more of the maneuver or the map data.

O: The method of any one of paragraphs F-N, the method further comprising determining an object type associated with the object, wherein the relevance polygon is further based at least in part on the object type.

P: A system or device comprising: one or more processors; and one or more non-transitory computer readable media storing instructions that, when executed, cause the one or more processors to perform a computer-implemented method as described in any one of paragraphs F-O.

Q: A system or device comprising: a means for processing; and a means for storing coupled to the means for processing, the means for storing including instructions to configure one or more devices to perform a computer-implemented method as described in any one of paragraphs F-O.

R: One or more non-transitory computer readable media storing instructions that, when executed, cause one or more processors to perform a method recited in any one of paragraphs F-O.

S: One or more non-transitory computer-readable media storing instructions executable by a processor, wherein the instructions, when executed, cause the processor to perform operations comprising: determining a speed associated with a vehicle operating in an environment; determining a region proximate the vehicle based at least in part on the speed; receiving sensor data from one or more sensors; identifying an object at a location in an environment based at least in part on the sensor data; and determining that the object is relevant to the vehicle based at least in part on the location of the object being associated with the region.

T: The one or more non-transitory computer-readable media of paragraph S, wherein the region comprises a polygon, the operations further comprising: controlling the vehicle based on inclusion of data associated with the object.

U: The one or more non-transitory computer-readable media of paragraph S, the operations further comprising: determining an object trajectory associated with the object; and determining an initial determination of irrelevance based on the object trajectory, wherein determining that the object is relevant to the vehicle is based at least in part on determining that a relevance determination based on the region overrides the initial determination of irrelevance.

V: The one or more non-transitory computer-readable media of paragraph S, wherein the object is a first object at a first location, the operations further comprising: generating a top-down representation of the environment based at least in part on the sensor data; determining, based at least in part on the top-down representation, a second object at a second location in the environment, wherein the second object is at least partially occluded by the first object; determining that the second object is outside of a boundary associated with the region; modifying the region to obtain a modified relevance polygon that includes the second location based at least in part on the second object being at least partially occluded by the first object; and controlling the vehicle based on inclusion of data associated with the second object.

W: The one or more non-transitory computer-readable media of paragraph S, wherein: the region has a size greater than or equal to a minimum size, and determining the region comprises scaling the size of the reference polygon with the speed for speeds greater than or equal to a threshold speed.

While the example clauses described above are described with respect to one particular implementation, it should be understood that, in the context of this document, the content of the example clauses can also be implemented via a method, device, system, a computer-readable medium, and/or another implementation. Additionally, any of examples A-W may be implemented alone or in combination with any other one or more of the examples A-W.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle system comprising:
one or more sensors;
one or more processors; and
memory storing processor-executable instructions that, when executed by the one or more processors, configure the vehicle system to:
receive sensor data from the one or more sensors;
identify, at a first time, an object at a first location in an environment based at least in part on the sensor data;
determine, at the first time, a first speed associated with a vehicle operating in the environment;
determine, at a second time, a planned second speed associated with the vehicle operating in the environment;
generate a relevance polygon associated with a planned path of the vehicle through the environment, the relevance polygon having a first width determined based at least in part on the first speed and a second width determined based at least in part on the planned second speed;
determine that the first location of the object is outside a first boundary of the relevance polygon;
determine, based at least in part on determining that the first location of the object is outside the first boundary, that the object is irrelevant to the vehicle at the first time; and
control the vehicle based on exclusion of data associated with the object at the first time based at least in part on determining that the object is irrelevant to the vehicle.

2. The vehicle system of claim 1, wherein the relevance polygon comprises a first relevance polygon associated with the first speed and a second relevance polygon associated with the planned second speed.

3. The vehicle system of claim 2, wherein:
the first relevance polygon comprises at least two of:
a first width, a first length or a first height;
the second relevance polygon comprises at least two of:
a second width, a second length or a second height;
the planned second speed is greater than the first speed; and
at least one of:
the second width is greater than the first width;
the second length is greater than the first length; or
the second height is greater than the first height.

4. The vehicle system of claim 1, wherein the object is a first object and the processor-executable instructions further configure the vehicle to:
identify a second object at a second location in the environment based at least in part on the sensor data, wherein the second object is at least partially occluded by the first object;
determine that the second object is outside of the first boundary associated with the relevance polygon;
modify the relevance polygon to obtain a modified relevance polygon that includes the second location based at least in part on the second object being at least partially occluded by the first object;
determine that the second object is relevant to the vehicle based at least in part on the second location being associated with the modified relevance polygon; and
control the vehicle based on data associated with the second object.

5. A method comprising:
determining, at a first time, a first speed associated with a vehicle operating in an environment;
determining an acceleration associated with the vehicle operating in the environment;
determining, at a second time, a planned second speed associated with the vehicle operating in the environment;
generating a relevance polygon associated with the vehicle, wherein the relevance polygon extends a first extent along a planned path in a direction the vehicle is traveling and a second extent normal to the planned path, the first extent determined based at least in part on the first speed and the second extent varying along the planned path based at least in part on the planned second speed and the acceleration associated with the vehicle; receiving sensor data from one or more sensors;
identifying an object at a location in the environment based at least in part on the sensor data; and
determining that the object is relevant to the vehicle based at least in part on the location of the object being associated with the relevance polygon.

6. The method of claim 5, further comprising:
controlling the vehicle based on inclusion of data associated with the object.

7. The method of claim 5, wherein the speed is a first speed of the vehicle at a first time and the relevance polygon is a first relevance polygon, the method further comprising:
   determining a second speed associated with the vehicle at a second time; and
   generating a second relevance polygon based at least in part on the second speed.

8. The method of claim 7, wherein
   the first relevance polygon defines a first area,
   the second relevance polygon defines a second area;
   the second speed is less than the first speed; and
   the second area is less than the first area.

9. The method of claim 5, wherein the object is a first object located at a first location, the method further comprising:
   identifying a second object at a second location in the environment based at least in part on the sensor data;
   determining that the second location is outside of a boundary associated with the relevance polygon;
   determining that the second object is irrelevant to the vehicle; and
   controlling the vehicle based on exclusion of data associated with the second object.

10. The method of claim 5, wherein the object is a first object located at a first location, the method further comprising:
    determining a second object at a second location in the environment based at least in part on the sensor data, wherein the second object is at least partially occluded by the first object;
    determining that the second object is outside of a boundary associated with the relevance polygon; and
    modifying the relevance polygon to obtain a modified relevance polygon that includes the second location based at least in part on the second object being at least partially occluded by the first object.

11. The method of claim 5, wherein:
    the relevance polygon is defined by a minimum size if the speed is less than or equal to a threshold speed.

12. The method of claim 5, further comprising:
    receiving map data associated with the environment,
    wherein the relevance polygon is further based at least in part on the map data.

13. The method of claim 5, the method further comprising:
    determining an object type associated with the object,
    wherein the relevance polygon is further based at least in part on the object type.

14. The method of claim 5, wherein the relevance polygon is further defined by a third extent extending along the planned path in a direction opposite the direction of the vehicle,
    the third extent is determined based at least in part on the speed, and
    the third extent differs from the first extent.

15. One or more non-transitory computer-readable media storing instructions executable by a processor, wherein the instructions, when executed, cause the processor to perform operations comprising:
    determining, at a first time, a first speed associated with a vehicle operating in an environment;
    determining an acceleration of the vehicle operating in the environment;
    determining, at a second time, a planned second speed associated with the vehicle operating in the environment;
    determining a region proximate the vehicle, wherein the region extends a first extent along a planned path in a direction the vehicle is traveling and a second extent normal to the planned path, the first extent determined based at least in part on the first speed and the second extent varying along the planned path based at least in part on the planned second speed and the acceleration associated with the vehicle;
    receiving sensor data from one or more sensors;
    identifying an object at a location in an environment based at least in part on the sensor data; and
    determining that the object is relevant to the vehicle based at least in part on the location of the object being associated with the region.

16. The one or more non-transitory computer-readable media of claim 15, wherein the region comprises a polygon, the operations further comprising:
    controlling the vehicle based on inclusion of data associated with the object.

17. The one or more non-transitory computer-readable media of claim 15, wherein the object is a first object at a first location, the operations further comprising:
    generating a representation of the environment based at least in part on the sensor data;
    determining, based at least in part on the representation, a second object at a second location in the environment, wherein the second object is at least partially occluded by the first object;
    determining that the second object is outside of a boundary associated with the region;
    modifying the region to obtain a modified relevance polygon that includes the second location based at least in part on the second object being at least partially occluded by the first object; and
    controlling the vehicle based on inclusion of data associated with the second object.

18. The one or more non-transitory computer-readable media of claim 15, wherein:
    the region has a size greater than or equal to a minimum size.

19. The method of claim 14, wherein a width of the relevance polygon is further based at least in part on a planned maneuver of the vehicle.

* * * * *